United States Patent [19]

Yamashita et al.

[11] Patent Number: 5,413,735

[45] Date of Patent: May 9, 1995

[54] LIQUID CRYSTAL COMPOSITION, LIQUID CRYSTAL DEVICE USING THE LIQUID CRYSTAL COMPOSITION, AND DISPLAY METHOD AND APPARATUS USING THE LIQUID CRYSTAL COMPOSITION AND DEVICE

[75] Inventors: Masataka Yamashita; Masahiro Terada; Shousei Mori, all of Kanagawa; Kazuharu Katagiri, Tokyo, all of Japan

[73] Assignee: Canon Kabushiki Kaisha, Tokyo, Japan

[21] Appl. No.: 130,427

[22] Filed: Oct. 1, 1993

Related U.S. Application Data

[63] Continuation of Ser. No. 704,600, May 23, 1991, abandoned.

[30] Foreign Application Priority Data

May 24, 1990 [JP] Japan ................... 2-135881
Mar. 5, 1991 [JP] Japan ................... 2-038652

[51] Int. Cl.⁶ ............... C09K 19/34; C09K 19/12; G02F 1/13
[52] U.S. Cl. ............. 252/299.61; 359/103; 252/299.63; 252/299.66; 252/299.67
[58] Field of Search ........... 252/299.61, 299.63, 252/299.66, 299.67; 359/103

[56] References Cited

U.S. PATENT DOCUMENTS

| | | | |
|---|---|---|---|
| 4,367,924 | 1/1983 | Clark et al. | 359/56 X |
| 4,659,503 | 4/1987 | Eidenschink et al. | 252/299.61 |
| 4,904,410 | 2/1990 | Nohira et al. | 252/299.61 |
| 5,034,151 | 7/1991 | Shinjo et al. | 252/299.61 |
| 5,091,109 | 2/1992 | Takeguchi et al. | 252/299.61 |
| 5,116,530 | 5/1992 | Togano et al. | 252/299.61 |
| 5,244,595 | 9/1993 | Yamada et al. | 252/299.61 |
| 5,268,123 | 12/1993 | Mori et al. | 252/299.61 |

FOREIGN PATENT DOCUMENTS

| | | |
|---|---|---|
| 0364923 | 10/1989 | European Pat. Off. |
| 107216 | 8/1981 | Japan. |
| 193426 | 11/1984 | Japan. |
| 193427 | 11/1984 | Japan. |
| 156046 | 8/1985 | Japan. |
| 156047 | 8/1985 | Japan. |
| 022042 | 1/1988 | Japan. |
| 122651 | 5/1988 | Japan. |

*Primary Examiner*—Robert L. Stoll
*Assistant Examiner*—C. Harris
*Attorney, Agent, or Firm*—Fitzpatrick, Cella, Harper & Scinto

[57] ABSTRACT

A liquid crystal composition comprises at least one type of liquid crystal compound having the following general formula (I) and at least one type of liquid crystal compound having the following general formula (II):

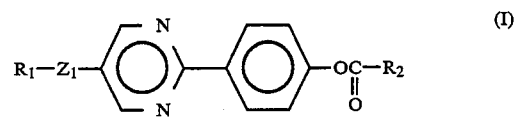

wherein $R_1$ and $R_2$ each is a straight-chain or branched-chain alkyl group having 1 to 18 carbon atoms. These alkyl groups may have alkoxy groups having 1 to 12 carbon atoms as substituents. Both $R_1$ and $R_2$ are optically inactive. $Z_1$ is a single bond, —O—,

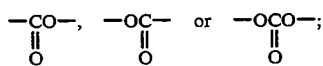

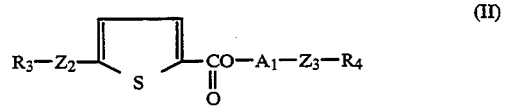

wherein $R_3$ and $R_4$ each is a straight-chain or branched-chain alkyl group having 1 to 18 carbon atoms. $Z_2$ and $Z_3$ each is single bond, (Abstract continued on next page.)

$A_1$ is —$A_2$— or —$A_2$—$A_3$—, wherein $A_2$ and $A_3$ are
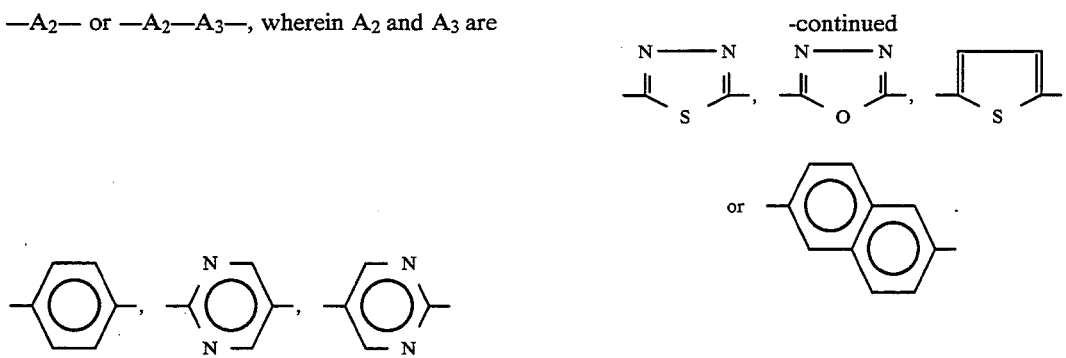
21 Claims, 8 Drawing Sheets

LIQUID CRYSTAL COMPOSITION, LIQUID CRYSTAL DEVICE USING THE LIQUID CRYSTAL COMPOSITION, AND DISPLAY METHOD AND APPARATUS USING THE LIQUID CRYSTAL COMPOSITION AND DEVICE This application is a continuation of application Ser. No. 07/704,600, filed May 23, 1991, now abandoned.

BACKGROUND OF THE INVENTION

1. Field of the Invention

The present invention relates to a liquid crystal composition, a liquid crystal display device using the liquid crystal composition, and display method and apparatus using the liquid crystal composition and device.

More particularly, the present invention is concerned with a novel liquid crystal composition having improved electric-field response characteristic, a liquid crystal display device such as a liquid crystal-optical shutter, using the liquid crystal composition, and display method and apparatus using such a liquid crystal display device.

2. Description of the Preferred Embodiment

Use of bi-stable liquid crystal device has been proposed by Clark and Lagerwall in, for example, U.S. Pat. No. 4,367,924 and Japanese Patent Laid-Open Application No. 56-107216.

In general, ferroelectric liquid crystals having a chiral smectic C phase (SmC* phase) or chiral smectic H phase (SmH* phase) are used as bi-stable liquid crystals.

The above-mentioned ferroelectric liquid crystal has a bi-stable characteristic: namely, it can take first and second optically stable states. Therefore, the liquid crystal of this type is oriented in a first optically stable state in response to, for example, one of two electric field vectors and is oriented to a second optically stable state under the influence of the other electric field, unlike TN (Twisted Nematic) liquid crystal used in optical modulating device. In addition, this type of liquid crystal takes either one of these two stable states and maintain this state unless an electric field is applied. This feature is generally referred to as a "bi-stable" characteristic.

Ferroelectric liquid crystal also exhibits, in addition to the above-described bi-stable characteristic, a high response speed which owes to the fact that the transition of the orientation state is caused by the effects produced by spontaneous polarization of the liquid crystal itself and the electric field applied thereto. In fact, the response speed is 3 to 4 orders higher than that caused by the interaction between dielectric anisotropy and electric field.

Thus, ferroelectric liquid crystals generally have potential superiority. By using such superior characteristics, it is possible to fundamentally solve most of problems encountered by conventional TN type liquid crystal device. In particular, this type of liquid crystal is expected to find spreading use in the fields of high-speed optical shutters and high-density large-area display devices.

A simple matrix display device can be formed by sandwiching this ferroelectric liquid crystal layer between a pair of substrates. Such a display device can be driven by driving methods disclosed, for example, in Japanese Patent Laid-Open Nos. 59-193426, 59-193427, 60-156046 and 60-156047.

FIGS. 4 and 5 illustrate waveforms of signals employed in a driving method which is used in an embodiment of the present invention. FIG. 6 is a plan view of a ferroelectric liquid crystal panel 61 having matrix electrodes used in the present invention. The panel 61 shown in FIG. 6 has scanning lines 62 and data lines 63 crossing each other. A ferroelectric liquid crystal is disposed between the scanning line 62 and the data line 63 at each crossing point.

In FIG. 4, $S_S$ represents a select scanning waveform applied to a selected scanning line, while $S_N$ shows a non-select scanning waveform. $I_S$ shows a select information waveform applied to a selected data line. The information, in this case, is black. $I_n$ shows a non-select information signal which is, in this case, white, applied to a non-selected data line. In FIG. 4, $(I_S - S_S)$ and $(I_N - S_S)$ show voltage waveforms applied to pixels on a selected scanning line. Pixels which receive the voltage $(I_S - S_S)$ show black state, while pixels which are supplied with the voltage $(I_N - S_S)$ show white state.

FIG. 5 illustrate time-sequential waveforms used when information shown in FIG. 7 is displayed in accordance with the driving waveforms shown in FIG. 4.

In the driving example shown in FIGS. 4 and 5, the minimum time $\Delta t$ of application of a single polarity applied to the pixels on the scanning line corresponds to the time of the writing phase $t_2$ and the time of the 1-line clear phase $t_1$ is set to be equal to $2 \Delta t$.

The values of the parameters $V_S$, $V_I$, $\Delta t$ of the driving waveforms shown in FIGS. 4 and 5 are determined by the switching characteristic of the liquid crystal material used in the panel.

FIG. 8 is a graph showing the manner in which transmittance T changes in response to a change in the driving voltage $V = (V_S + V_I)$ when a bias ratio to be mentioned later is maintained constant. This characteristic will be referred to as (V−T) characteristic. In this case, the minimum time t is fixed to be 50 μsec, while the bias ratio $V_2/(V_2 + V_3)$ is fixed to ⅓. Waveforms $(I_N - S_S)$ and $(I_S - S_S)$ shown in FIG. 4 are respectively applied to the positive and negative sides of the graph shown in FIG. 8.

Voltages $V_1$ and $V_3$ are respectively referred to as "real drive threshold voltage" and "crosstalk voltage", respectively. These voltages meet the condition of $V_2 < V_1 < V_3$. The difference $V = V_3 - V_1$ is referred to as a "voltage margin" which represents the voltage width in which the display matrix is drivable. It is considered that the crosstalk voltage $V_3$ generally exists in driving an FLC display device. Moe practically, the crosstalk voltage $V_3$ is the voltage at which switching is caused by $V_B$ in the waveform $(I_N - I_S)$ shown in FIG. 4. It is of course possible to increase the value of the voltage $V_3$ by increasing the bias ratio. Increasing the bias ratio, however, means that the amplitude of the information signal is increased, with the result that the quality of the display image is undesirably degraded due to increase in flicker and reduction in contrast.

The inventors have found that good results are obtained when the bias ratio ranges between ⅓ and ¼. If the bias ratio is fixed, the voltage margin $\Delta V$ strongly depends on the switching characteristic of the liquid crystal material. Obviously, from the view point of ease of drive control of a matrix, it is advantageous that the liquid crystal material used has a large voltage margin $\Delta V$.

As will be understood from the foregoing description, it is possible to write either one of "black' and "white" states in a selected pixel by selective use of the two directions of the information signal, while the non-selected pixel can maintain its "black" or "white" state. The upper and lower limits of the voltage applied as well as the difference therebetween (drive voltage margin ΔV) varies according to the liquid crystal material. In other words, each liquid crystal material has its own upper and lower limit voltage levels and drive voltage margin ΔV. The drive voltage margin also shifts in accordance with a change in environmental temperature, so that display apparatuses must be designed to have an optimum driving voltage for the liquid crystal material used and the expected environmental temperature.

When a display apparatus having a large display area is designed by using this type of matrix display, the variation or difference in the environmental condition, e.g., temperature or cell gap between electrodes, over the liquid crystals of different pixels is increased correspondingly. This means that display image of good and uniform quality cannot be obtained over the large display area when the liquid crystal has only a small drive voltage margin.

SUMMARY OF THE INVENTION

The present invention is aimed at providing a liquid crystal composition having a uniform mono-domain orientation characteristic which allows for an easy orientation by a rubbing treatment and has a large drive voltage margin so as to enable all the liquid crystal pixels over a wide display area despite any local temperature variation, to have a wide drive temperature margin, thereby enabling practical use of ferroelectric liquid crystal display devices which are expected to be applicable to high-speed optical shutter and high-density, large-area display. It is also an object of the invention to provide a liquid crystal device using such a composition and display method and apparatus employing such a device.

According to the present invention, there is provided a liquid crystal composition comprising: at least one type of liquid crystal compound having the following general formula (I) and at least one type of liquid crystal compound having the following general formula (II).

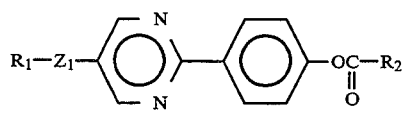

(I)

wherein $R_1$ and $R_2$ each is a straight-chain or branched-chain alkyl group having 1 to 18 carbon atoms. These alkyl groups may have alkoxy groups having 1 to 14 carbon atoms as substituents. Both $R_1$ and $R_2$ are optically inactive. $Z_1$ is a single bond, —O—,

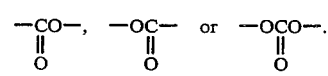

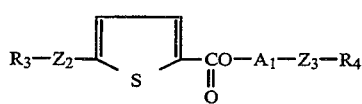

(II)

wherein $R_3$ and $R_4$ each is a straight-chain or branched-chain alkyl groups having 1 to 18 carbon atoms which may have substituents.

$Z_2$ and $Z_3$ each is a single bond,

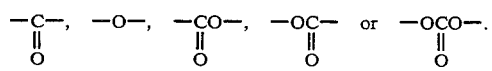

$A_1$ is —$A_2$— or —$A_2$—$A_3$—, wherein $A_2$ and $A_3$ each is

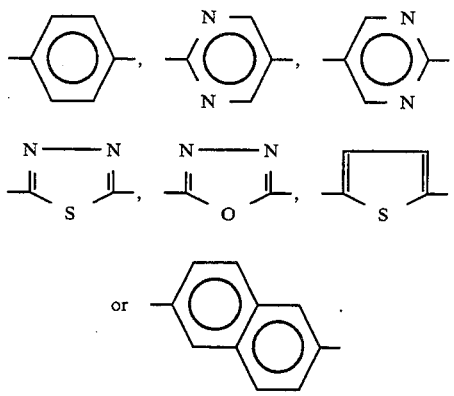

In a prefered form of the invention, the liquid crystal composition further comprises at least one type of liquid crystal compound having the following general formula (III).

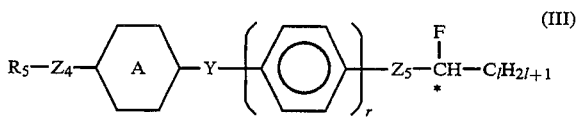

(III)

wherein $R_5$ is a straight-chain or branched-chain alkyl group which has 1 to 18 carbon atoms and which may have a substituent. Y is a single bond,

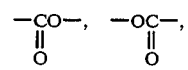

—$CH_2O$—, $OCH_2$—, —COS—, —SCO— or —CH=CH—COO—.

$Z_4$ is a single bond, —O—,

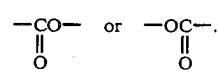

$Z_5$ is —$OCH_2$—, —$COCH_2$—, —OC—, —O—($CH_2$)$_k$—O—$CH_2$—, wherein k = an integer of 1 to 4.

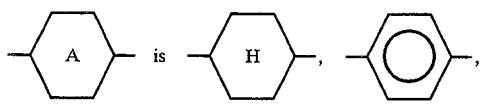

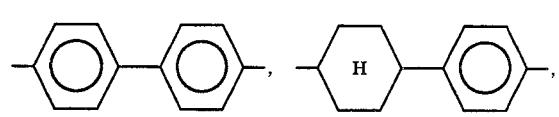

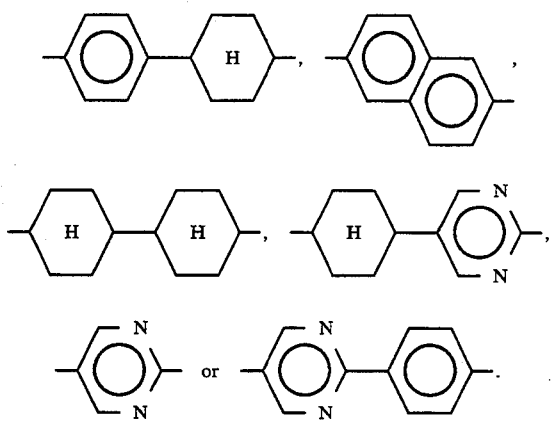

δ is an integer of 1 or 2. l is 1 to 12.

The invention also provides a liquid crystal display device in which the above-mentioned liquid crystal composition is disposed between a pair of electrode substrates, as well as a display method utilizing such a liquid crystal device.

DESCRIPTION OF THE PREFERRED EMBODIMENTS

Figure 1:
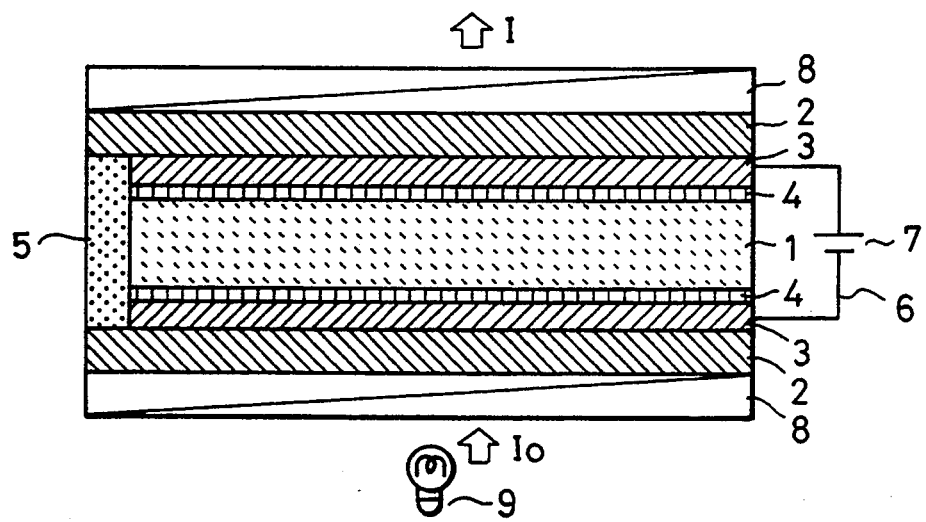
FIG. 1 is a schematic sectional view of an embodiment of a liquid crystal display device employing a liquid crystal which exhibits chiral smectic phase.

Among the liquid crystal compounds represented by the general formula (I), compounds expressed by the following formulae (Ia) and (Ib) are preferably used.

wherein $R_1$ and $R_2$ each is the alkyl group as defined before.

The following alkyl groups (I-i) to (I-iii) are preferably used as the alkyl groups $R_1$ and $R_2$ in the liquid crystal compositions having the general formula (I).

(I-i) Alkyl groups having 1 to 16 carbon atoms.

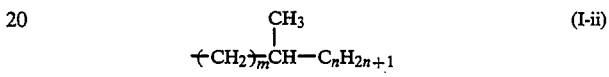

wherein m is an integer of 0 to 7 and n is an integer of 1 to 9, m and n satisfying the condition of $2 \leq m+n \leq 14$.

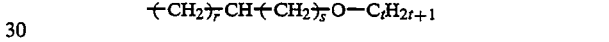

wherein r is an integer of 0 to 7 and s is 0 or 1 and t is an integer of 1 to 14, and r, s and t satisfying the condition of $1 \leq r+s+t \leq 14$.

Among the liquid crystal compounds having the general formula (II), compounds having the following formulae (IIa) to (IIe) are preferably used.

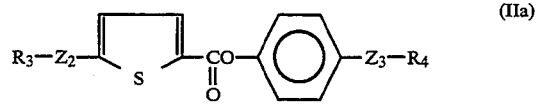

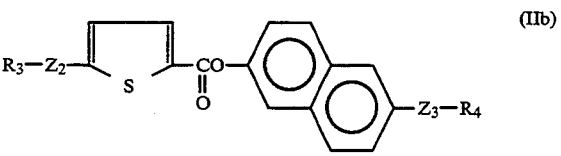

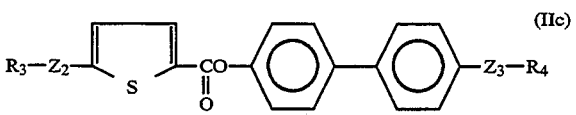

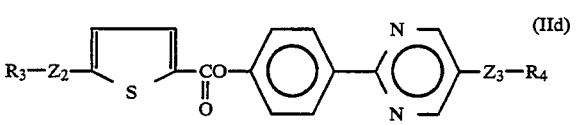

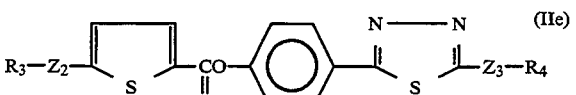

wherein $R_3$, $R_4$, $Z_2$ and $Z_3$ are as defined before.

More preferably, alkyl groups $R_3$ and $R_4$ are selected from the groups having the following formulae (II-i) to (II-iv).

(II-i) n-alkyl groups having carbon atom numbers of 2 to 16, preferably 4 to 14

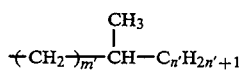
(II-ii)

wherein m' is an integer of 0 to 7 and n' is an integer of 1 to 9. This alkyl group may be photo-active.

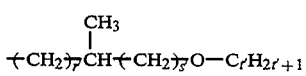
(II-iii)

wherein r' is an integer of 0 to 7, s' is 0 or 1 and t' is an integer of 1 to 14. This alkyl group may be photoactive.

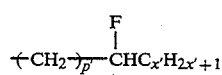
(II-iv)

wherein p' is 0 or 1 and x' is an integer of 1 to 14. Mark * represents a asymmetric carbon atom.

Among the liquid crystal compounds having the general formula (III), compounds having the following formulae (III-a) to (III-f) are preferably used.

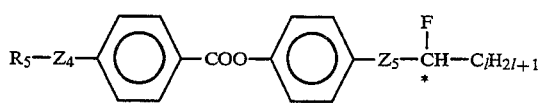
(III-a)

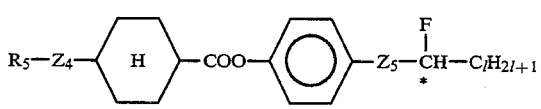
(III-b)

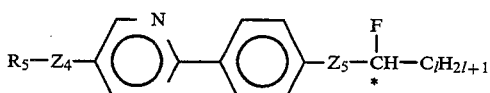
(III-c)

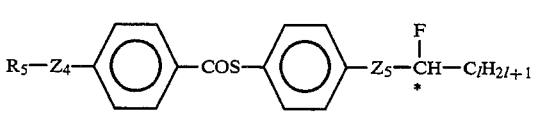
(III-d)

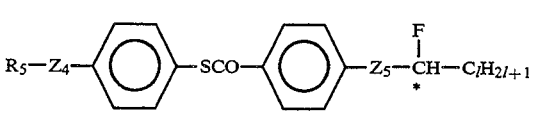
(III-e)

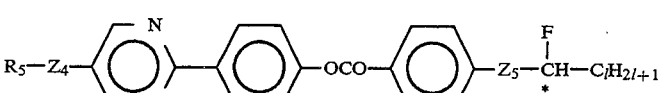
(III-f)

wherein $R_5$, $Z_4$, $Z_5$ and l are alkyl group, bonds and the number mentioned before.

Among the compounds having the formulae (III-a) to (III-f), those shown by the formulae (III-a), (III-b) and (III-c) are used most suitably.

Combinations shown by the following formulae (III-i) to (III-v) are preferably used as $Z_4$ and $Z_5$ in the formulae (III-a) to (III-f).

(III-i) $Z_4$ is a single bond and $Z_5$ is —O—$CH_2$—;
(III-ii) $Z_4$ is a single bond and $Z_5$ is —COO—$CH_2$—;
(III-iii) $Z_4$ is a single bond and $Z_5$ is —OCO—;
(III-iv) $Z_4$ is —O— and $Z_5$ is —O—$CH_2$—;
(III-v) $Z_4$ is —O— and $Z_5$ is —COO$CH_2$—.

A typical example of the synthesizing process for synthesizing the liquid crystal compound having the general formula (I) is shown below.

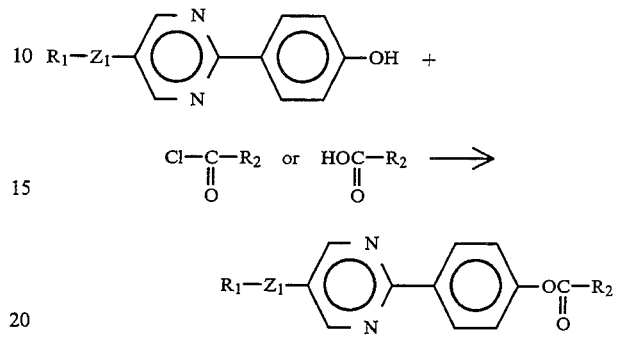

wherein $R_1$, $R_2$ and $Z_1$ are as defined before.

Typical examples of synthesis of the liquid crystal compositions having the general formula (I) are shown below.

SYNTHESIS EXAMPLE 1 (SYNTHESIS OF COMPOUND EXAMPLE NO. 1-22)

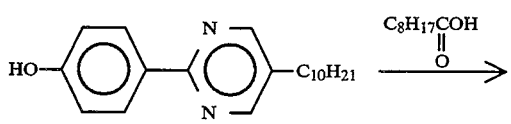

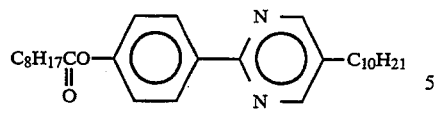   (5)

3.00 g (9.60 m mole) of 2-(4-hydroxyphenyl)-5-decylpyrimidine, 1.70 ml (9.74 m mole) of nonanic acid and 100 ml of methylene chloride were mixed together in a flask having an internal volume of 300 ml. While stirring the mixture at room temperature, 2.00 g (9.69 m mole) of N, N'-dicyclohexylcarbodiimide and 0.17 g of 4-pyrrolidinopyridine were sequentially added to the mixture.

The mixture was then stirred for 4 hours at the room temperature so that N, N'-dicyclohexylurea was precipitated. The precipitate was then removed by filtration. The filtered liquid was dried and solidified under a reduced pressure and the residue was refined with silica gel column chromatography using toluene as an eluate. The product was then re-crystallized by an acetone-methanol mixture solvent, whereby 3.78 g of 2-(4-nonanoyloxyphenyl)-5-decylpyrimidine was obtained (yield 87.0%).

Phase transition temperature (°C.)

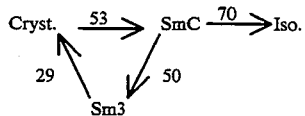

Illustrative examples of the liquid crystal compound having the general formula (I) are shown below.

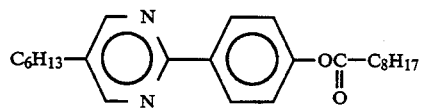  (1-1)

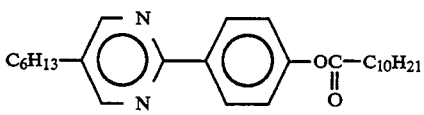  (1-2)

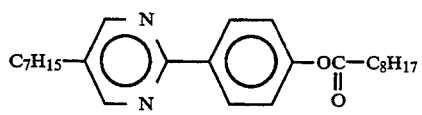  (1-3)

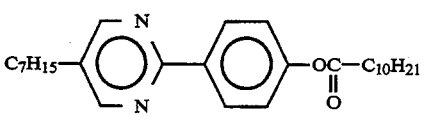  (1-4)

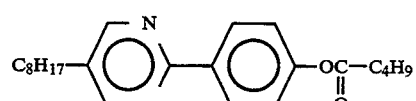  (1-5)

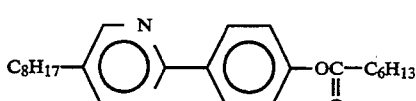  (1-6)

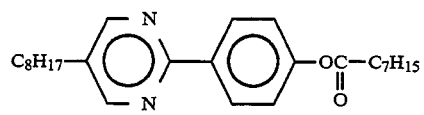  (1-7)

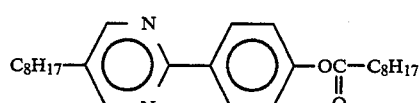  (1-8)

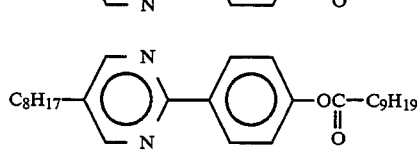  (1-9)

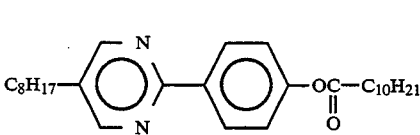  (1-10)

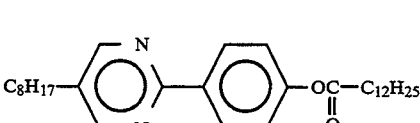  (1-11)

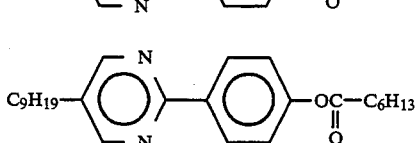  (1-12)

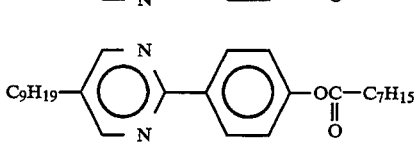  (1-13)

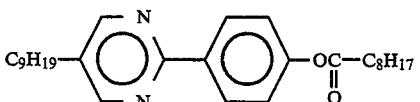  (1-14)

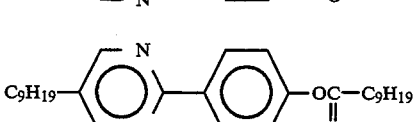  (1-15)

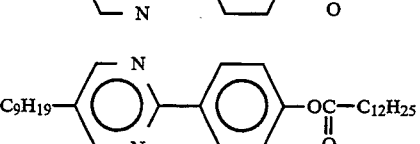  (1-16)

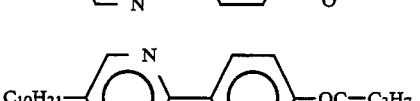  (1-17)

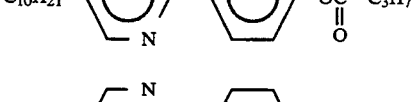  (1-18)

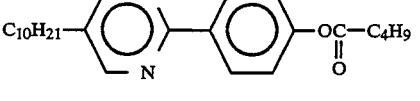  (1-19)

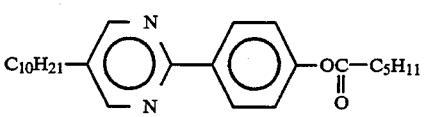

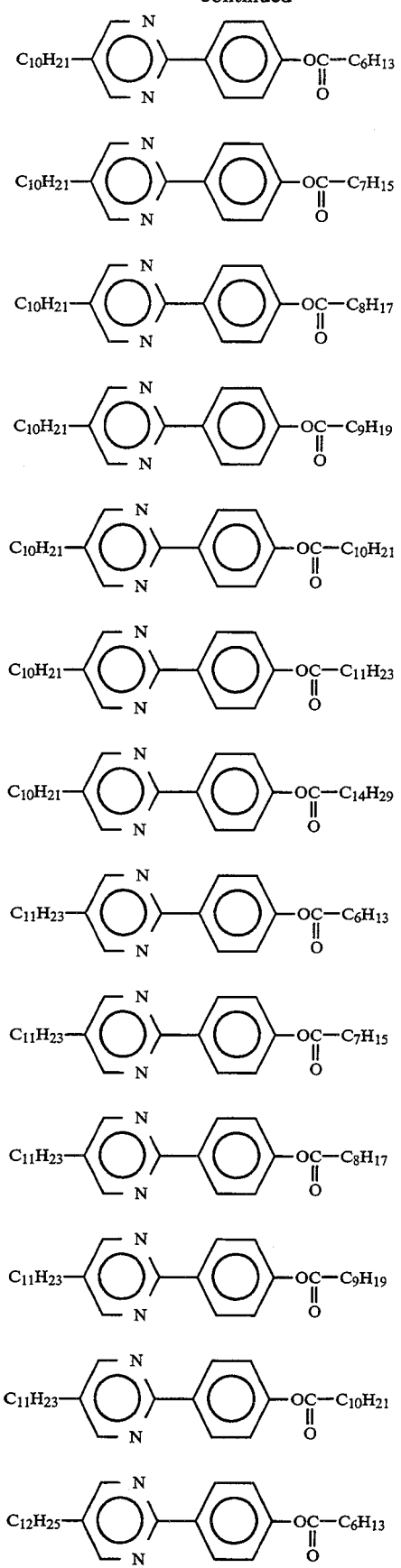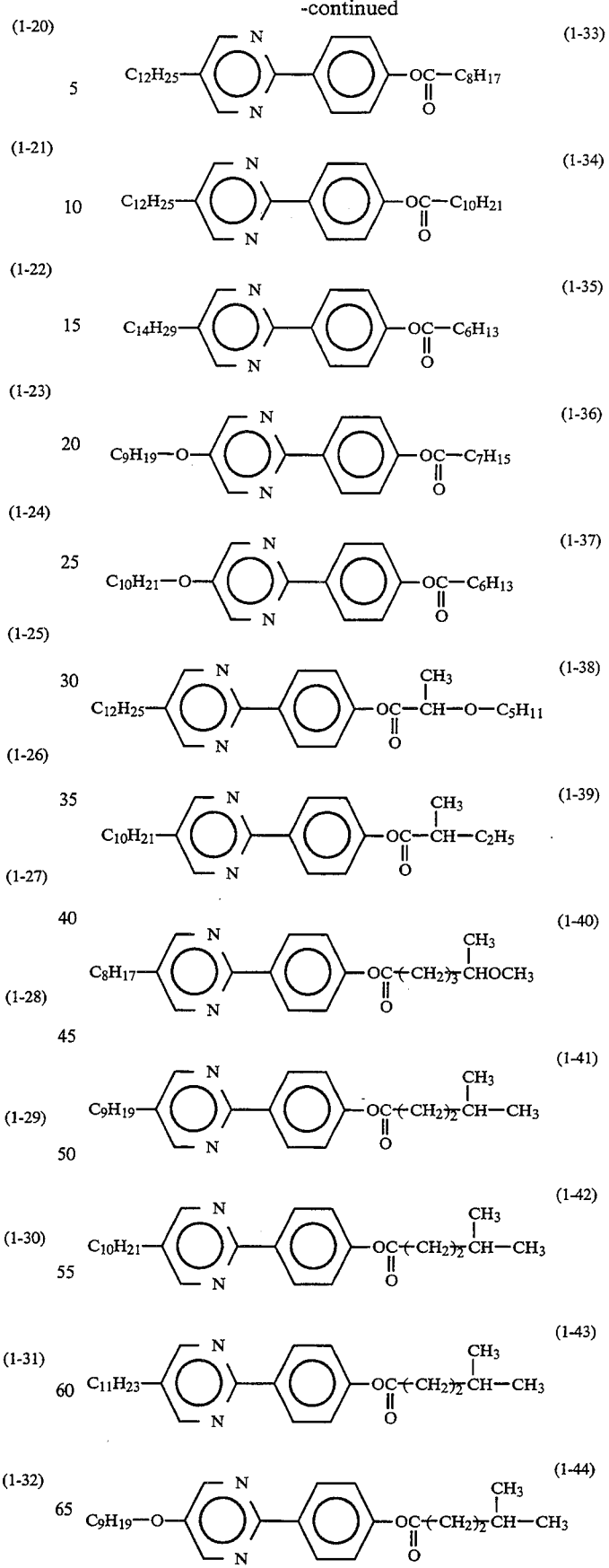

-continued

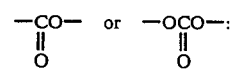 (1-45)

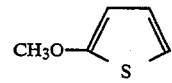 (1-46)

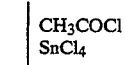 (1-47)

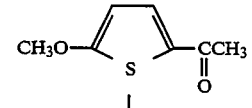 (1-48)

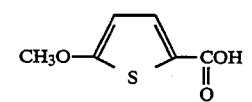 (1-49)

(1-50)

Typical examples of the process for synthesizing the liquid crystal compound having the general formula (II) are shown below.

When $Z_2$ is a single bond or $$-\underset{\underset{O}{\|}}{C}-:$$

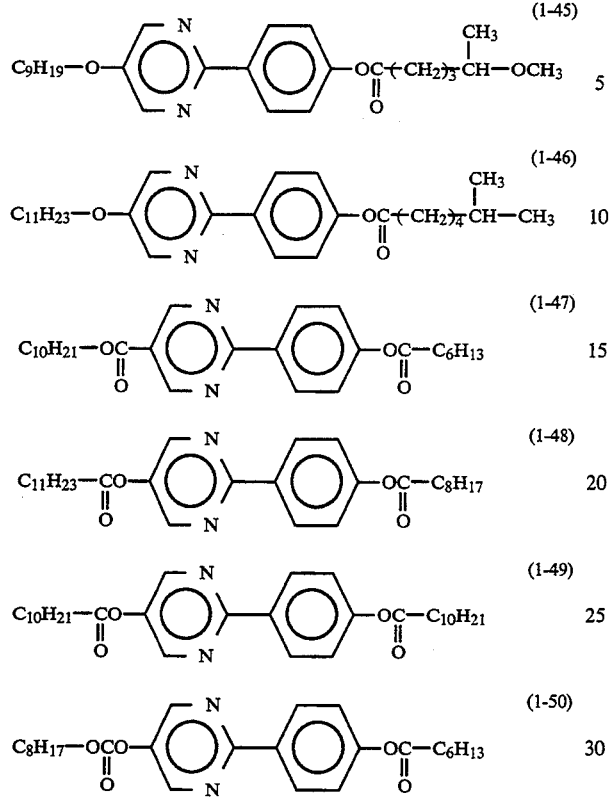

wherein R is a straight-chain or branched-chain alkyl group.

When $Z_2$ is —O—, $$-\underset{\underset{O}{\|}}{CO}- \quad \text{or} \quad -\underset{\underset{O}{\|}}{OCO}-:$$

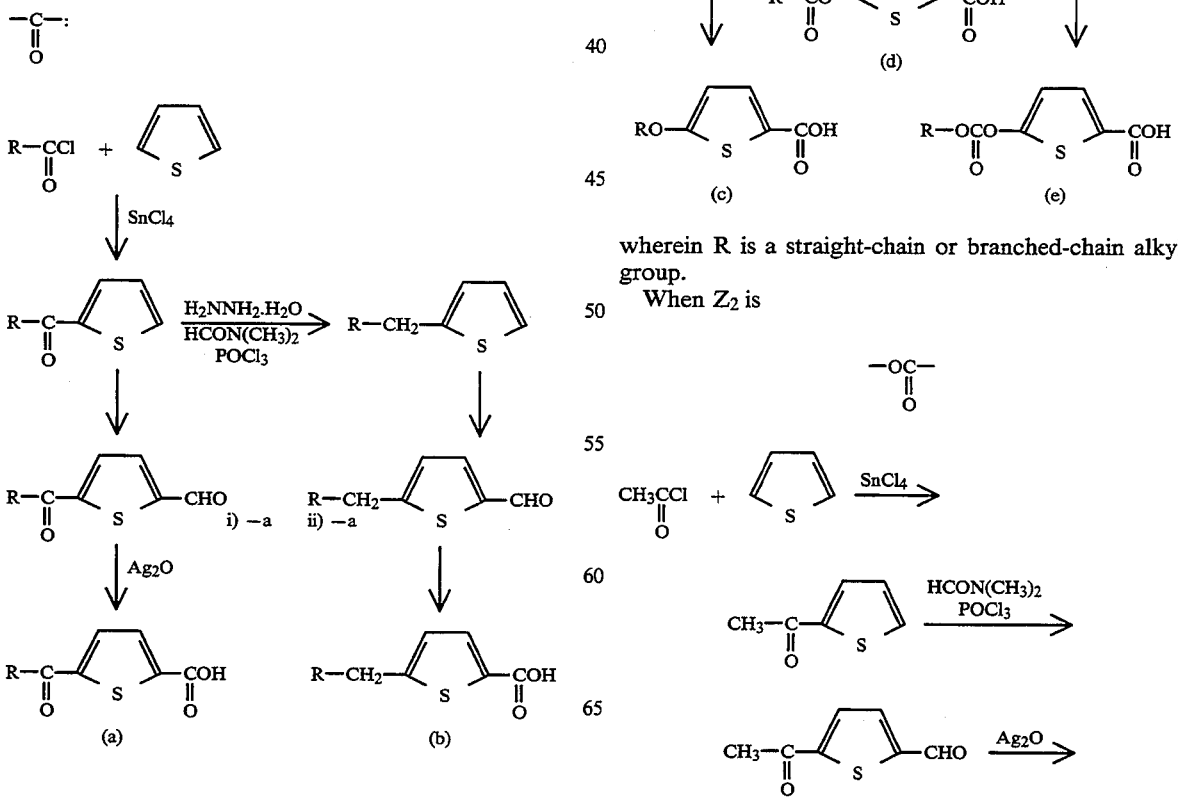

wherein R is a straight-chain or branched-chain alkyl group.

When $Z_2$ is $$-\underset{\underset{O}{\|}}{OC}-$$

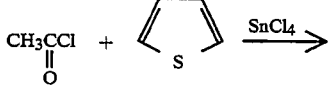

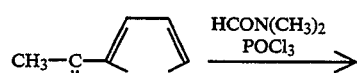

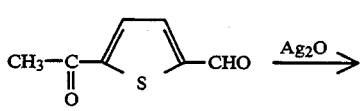

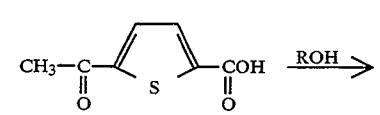

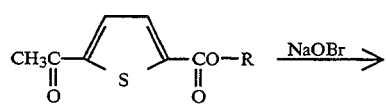

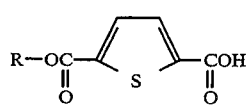

wherein R is a straight-chain or branched-chain alkyl group.

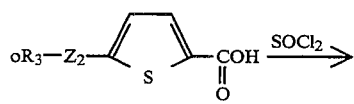

[(a)~(f)]

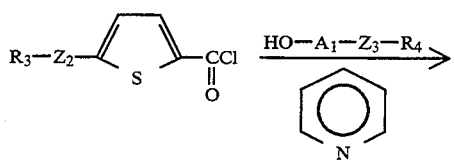

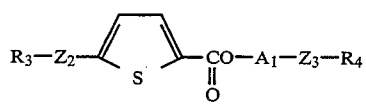

Typical examples of synthesis of the liquid crystal compounds having the general formula (II) are shown below.

SYNTHESIS EXAMPLE 2 (SYNTHESIS OF COMPOUND EXAMPLE NO. 2-53)

Production of 5-hexylthiophene-2-carboxyl-4-(5-dodecyl-2-pyrimidinyl) phenyl

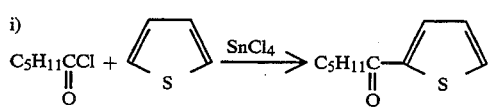

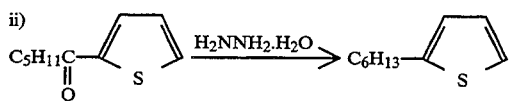

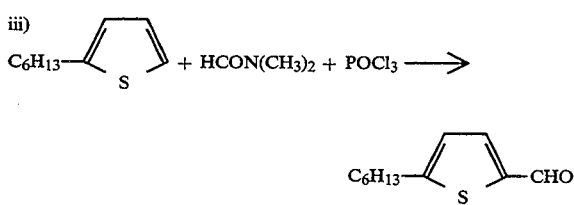

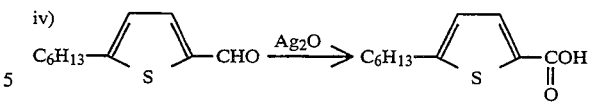

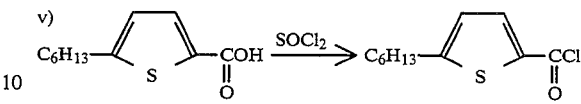

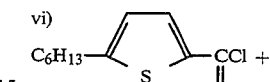

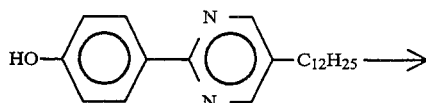

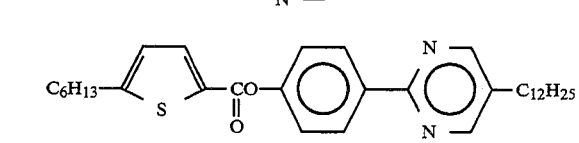

i) Production of 2-hexanoylthiophene 187.3 g (2.23 mol) of thiophene, 300 g (2.23 mol) of n-hexanoyl chloride and 2.7 l of dry benzene were charged in a 5-opening type flask having an internal volume of 5 l and were cooled down to a temperature below 0° C. 237.9 g of SnCl$_4$ (9.13×10$^{-1}$ mol) of a temperature below 0° C. was dripped over a 1 hour period to the mixture in the flask while the mixture was stirred. After a 30-minute stirring at the above-mentioned temperature, the mixture was made to react for period of 3.5 hours while the temperature of the mixture was gradually raised to the room temperature.

After completion of the reaction, 2 l of 10% HCl was added followed by a 10-minute stirring. Then, the benzene layer was scrubbed with 10% HCl (500 ml×3), water (500 ml×3), 5% Na$_2$CO$_3$ (500 ml×3) and finally with water (500 ml×3). After drying with CaCl$_2$ and a subsequent distillation for removing the solvent, 408 g of a coarse product was obtained. The unrefined product was distilled in flowing nitrogen atmosphere under a reduced pressure, whereby 313.4 g of refined product was obtained (yield 77.2%).

ii) Production of 2-hexyl thiophene 300 g (1.65 mol) of 2-hexanoylthiophene, 582.1 ml of hydrazine hydrate (60%) and 5 l of diethylene glycol were charged in a 5-opening type flask having an internal volume of 10 l. The mixture was made to react for 2 hours while being heated at 180° C. for removal of excess water and hydrazine hydrate. The mixture was then cooled to 110° C. and, after addition of 313.7 g of KOH, heated again to 180° C. and held at this temperature for 2 hours for reaction.

After completion of the reaction, the reaction product was poured to 10 l of water and was extracted by IPE (2 l×2). Then, scrubbing with water (2 l×4), drying with CaCl$_2$ and distillation for removal of solvent were sequentially conducted, whereby 285 g of unrefined product was obtained. The unrefined product was distilled in flowing nitrogen atmosphere under a reduced pressure, whereby 230 g of refined product was obtained (yield 83.0%).

iii) Production of 5-hexylthiophene-2-carbaldehyde 173.3 g (2.38 mol) of N,N-dimethylformamide was charged in a 4-opening type flask having an internal volume of 3 l, and was cooled to 5° C. Then, 201.4 g (1.31 mol) of POCl$_3$ was added over 15 minutes at a temperature not higher than 10° C. while stirring the mixture. After a 30-minute stirring at the same temperature, the temperature of the mixture was raised to room temperature and 200 g (1.19 mol) of 2-hexylthiophene was added by dripping over 10 minutes. The mixture was then stirred for 3.5 hours at the room temperature and was then heated to 60° C. and maintained at this temperature for 2 hours for reaction.

After completion of the reaction, the reaction product was poured to 5 l of ice water and was extracted by chloroform (2 l×3). Then, scrubbing with water (2 l×6), drying with CaCl$_2$ and distillation for removal of solvent were sequentially conducted. Then, distillation was conducted in a flowing nitrogen atmosphere under a reduced pressure, whereby 199.2 g of product was obtained (yield 85.0%).

iv) Production of 5-hexylthiophene-2-carboxylate 90.0 g ($4.59 \times 10^{-1}$ mol) of 5-hexylthiophene-2-carbaldehyde, 540 ml of ethanol and an aqueous solution of AgNO$_3$ (AgNO$_3$ 171.0 g, water 540 ml) were charged in a 4-opening type flask having an internal volume of 5 l. Then, an aqueous solution of NaOH (NaOH 91.8 g, water 270 ml) was added by dripping over 30 minutes at room temperature. The mixture was then left for 1.5 hours for reaction.

The reaction product was filtered and the filtered liquid was acidified with 6N-HCl to allow for precipitation of crystals followed by filtration, whereby an unrefined product was obtained. The unrefined product was then recrystallized with 50% aqueous ethanol, whereby 74.5 g of refine product was obtained (yield 76.6%).

v) Production of 5-hexylthiophene-2-carboxylic acid chloride 10 m of thionyl chloride was added to 1.0 g ($4.72 \times 10^{-3}$ mol) of 5-hexylthiophene-2-carboxylate and the mixture was stirred for 4 hours at 80° C., followed by removal of excess thionyl chloride, whereby 5-hexylthiophene-2-carboxylic acid chloride was obtained.

vi) Production of 5-hexylthiophene-2-carboxylate-4-(5-dodecyl-2-pyrimidinyl) phenyl 15 ml of pyridine was added to 0.80 g ($2.36 \times 10^{-3}$ mol) of 4-(5-dodecyl-2-pyrimidinyl) phenol and the mixture was cooled in ice water. Then, 0.54 g ($2.36 \times 10^{-3}$ mol) of 5-hexylthiophene-2-carboxylic acid chloride was added and the mixture was held for 5 hours at room temperature for reaction. After completion of the reaction, the reaction product was poured into 100 ml of water and was acidified by a concentrated sulfuric acid, followed by extraction by isopropylether (50 ml×3). Then scrubbing with water was repeated until the scrubbing water becomes neutral. Subsequently, drying was conducted by using anhydrous magnesium sulfate, followed by removal of solvent by distillation, whereby an unrefined product was obtained. The thus-obtained unrefined product was refined by means of silica gel column chromatography (developing solution hexane/ethylacetate=10/1) and recrystallization from ethanol was effected, whereby 0.38 g of a refined product was obtained (yield 30.2%).

Phase transition temperature (°C.)

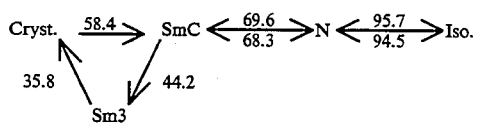

SYNTHESIS EXAMPLE 3 (COMPOUND EXAMPLE 2-23)

Production of 5-dodecyl-2-thiophenecarboxylate 4-(4'-decylbiphenyl)ester 0.7 g of the above-mentioned compound was obtained through the same process as Synthesis Example 2, except that 4-(5-dodecyl-2-pyrimidiyl) phenol and 5-hexylthiophene-2-carboxylic acid chloride in step vi) of Synthesis Example 2 were respectively replaced by 4'-decylbiphenyl-4-ol and 5-dodecylthiophene-2-carboxylic acid chloride (yield 73%).

Phase transition temperature (°C.)

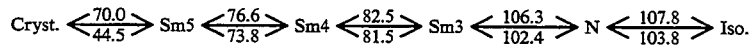

Illustrative examples of the liquid crystal compounds expressed by the general formula (II) are shown below.

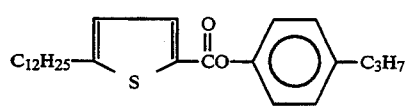

(2-1)

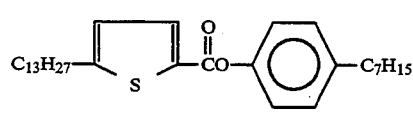

(2-2)

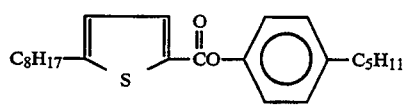

(2-3)

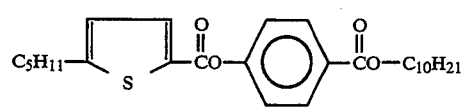

(2-4)

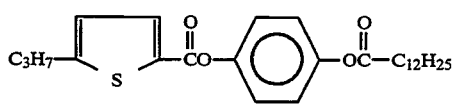

(2-5)

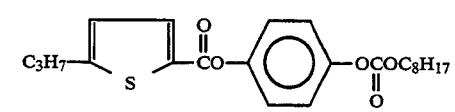

(2-6)

-continued
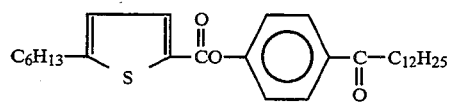 (2-7)
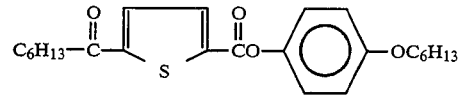 (2-8)
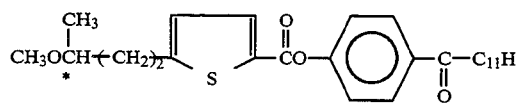 (2-9)
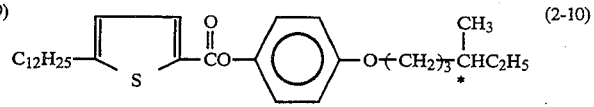 (2-10)
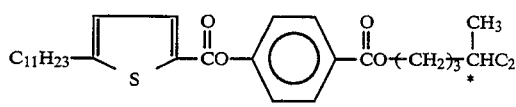 (2-11)
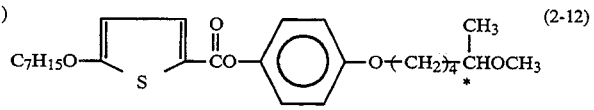 (2-12)
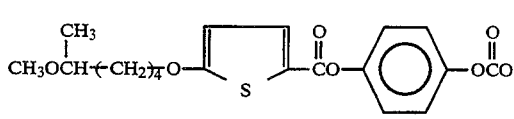 (2-13)
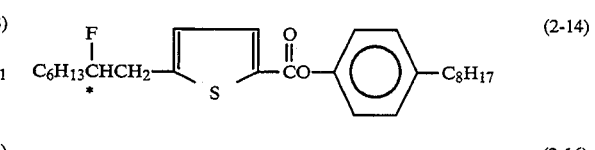 (2-14)
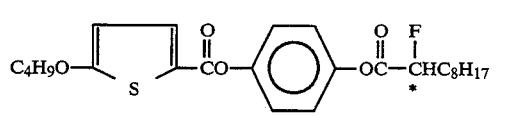 (2-15)
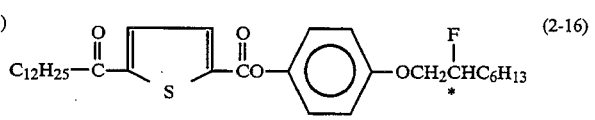 (2-16)
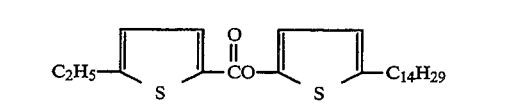 (2-17)
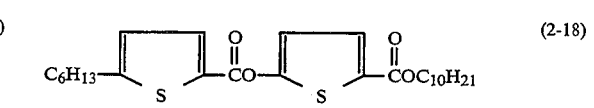 (2-18)
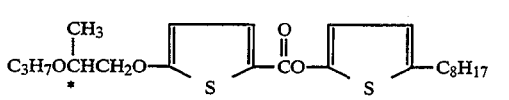 (2-19)
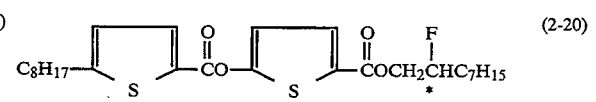 (2-20)
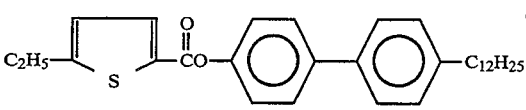 (2-21)
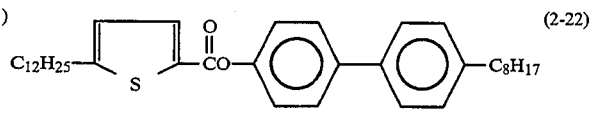 (2-22)
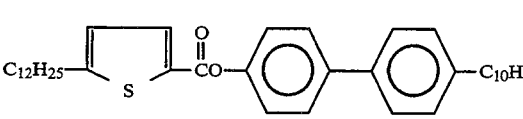 (2-23)
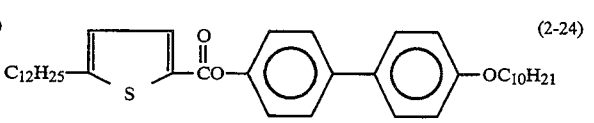 (2-24)
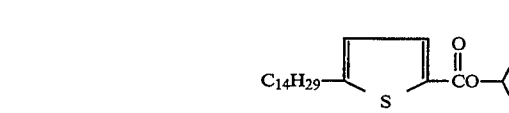 (2-25)
 (2-26)
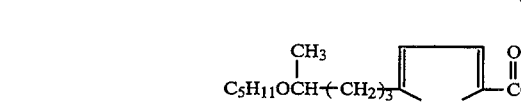 (2-27)
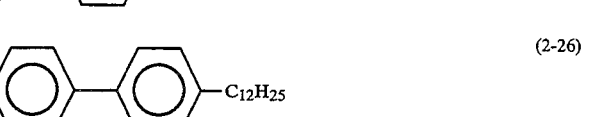 (2-28)
 (2-29)

-continued $C_6H_{13}O-\text{thiophene}-CO-O-\text{biphenyl}-(CH_2)_3\text{CH}^*(CH_3)OC_5H_{11}$ (2-30)

$C_{11}H_{23}-\text{thiophene}-CO-O-\text{biphenyl}-O-CO-(CH_2)_2\text{CH}^*(CH_3)OCH_3$ (2-31)

$C_2H_5\text{CH}^*(CH_3)CH_2-\text{thiophene}-CO-O-\text{biphenyl}-C_6H_{13}$ (2-32)

$C_2H_5\text{CH}^*(CH_3)CH_2O-\text{thiophene}-CO-O-\text{biphenyl}-C_8H_{17}$ (2-33)

$C_2H_5\text{CH}^*(CH_3)CH_2O-\text{thiophene}-CO-O-\text{biphenyl}-OC_{10}H_{21}$ (2-34)

$C_7H_{15}O-CO-\text{thiophene}-CO-O-\text{biphenyl}-CH_2\text{CH}^*(CH_3)C_2H_5$ (2-35)

$C_4H_9-CO-\text{thiophene}-CO-O-\text{biphenyl}-O\text{CH}^*(CH_3)CH_2OC_5H_{11}$ (2-36)

$C_4H_9\text{CH}^*(F)CH_2O-\text{thiophene}-CO-O-\text{biphenyl}-OC_7H_{15}$ (2-37)

$C_8H_{17}-\text{thiophene}-CO-O-\text{biphenyl}-OCH_2\text{CH}^*(F)C_2H_5$ (2-38)

$C_3H_7-\text{thiophene}-CO-O-\text{phenyl}-\text{pyrimidine}-C_6H_{13}$ (2-39)

$C_3H_7-\text{thiophene}-CO-O-\text{phenyl}-\text{pyrimidine}-C_9H_{19}$ (2-40)

$C_3H_7-\text{thiophene}-CO-O-\text{phenyl}-\text{pyrimidine}-C_{11}H_{23}$ (2-41)

$C_4H_9-\text{thiophene}-CO-O-\text{phenyl}-\text{pyrimidine}-C_6H_{13}$ (2-42)

$C_4H_9-\text{thiophene}-CO-O-\text{phenyl}-\text{pyrimidine}-C_9H_{19}$ (2-43)

$C_4H_9-\text{thiophene}-CO-O-\text{phenyl}-\text{pyrimidine}-C_{10}H_{21}$ (2-44)

$C_4H_9-\text{thiophene}-CO-O-\text{phenyl}-\text{pyrimidine}-C_{11}H_{23}$ (2-45)

$C_4H_9-\text{thiophene}-CO-O-\text{phenyl}-\text{pyrimidine}-C_{12}H_{25}$ (2-46)

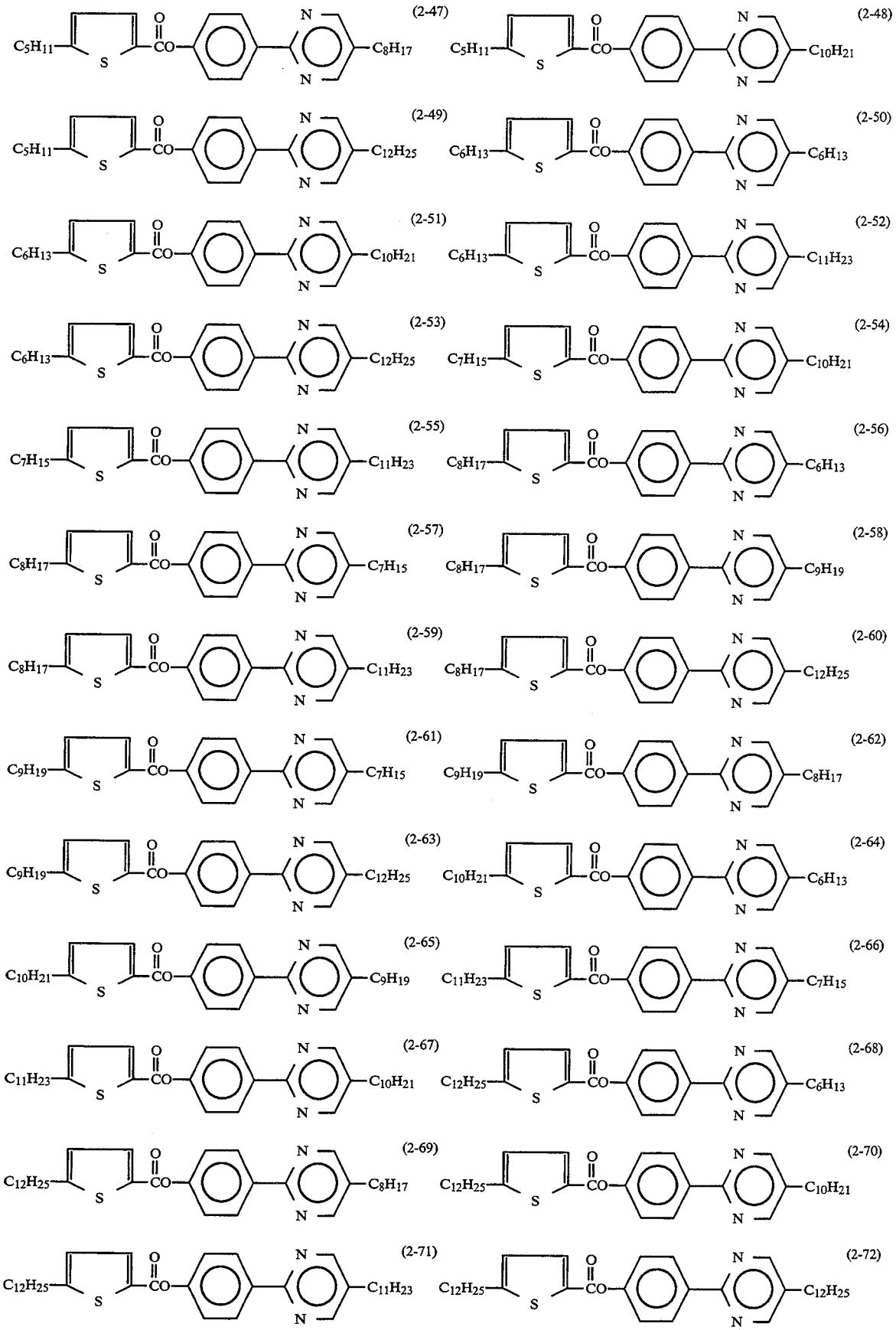

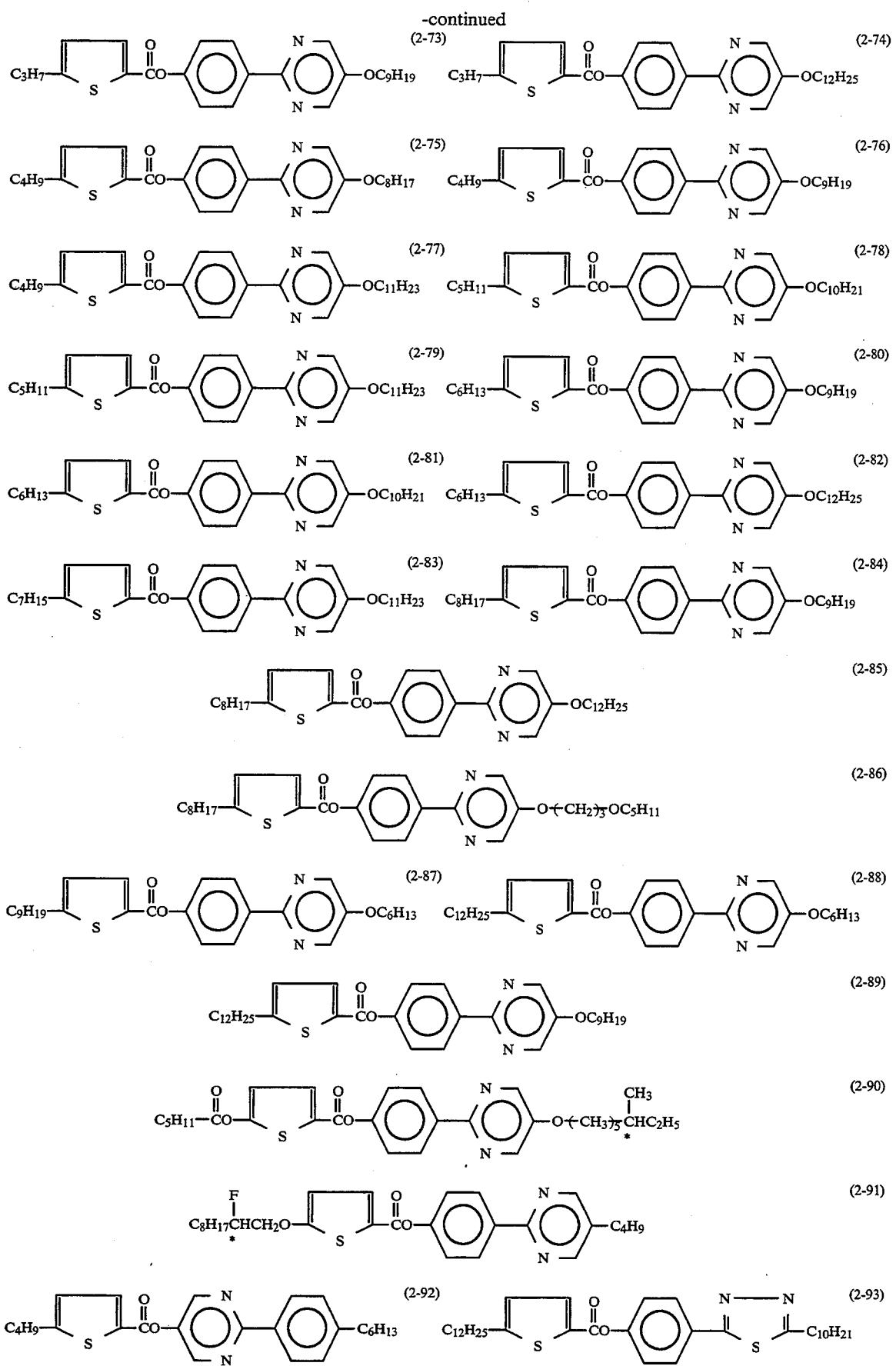

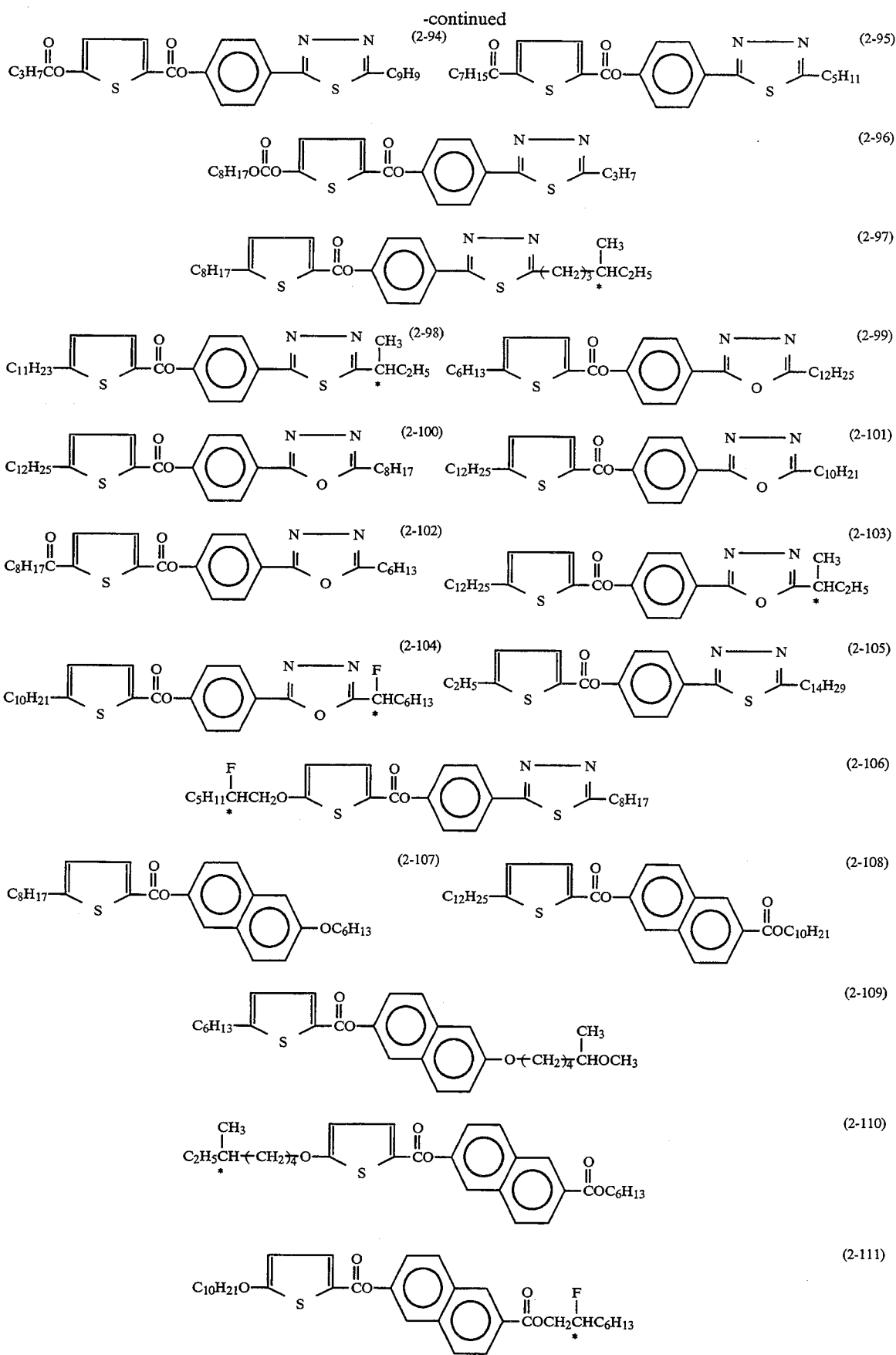

The compounds having the general formula (III) can be obtained, for example, by methods disclosed in Japanese Patent Laid-Open Nos. 63-22042 and 63-122651. Typical examples of the synthesis are shown below.

SYNTHESIS EXAMPLE 5 (SYNTHESIS OF COMPOUND EXAMPLE NO. 3-28)

A first solution was prepared by dissolving 1.00 g (4.16 mM) of p-2-fluorooctyloxyphenol in a mixture solvent composed of 10 ml of pyridine and 5 ml of toluene. A second solution was prepared by dissolving 1.30 g (6.00 mM) of trans-4-n-pentylcyclohexane carboxylic acid chloride in 5 ml of toluene. The second solution was added by dripping to the first solution in a period of 20 to 40 minutes at a temperature not lower than 5° C. After dripping, the mixture was stirred overnight at room temperature, whereby white precipitate was obtained.

After completion of the reaction, the reaction product was extracted by benzene and the benzene layer was scrubbed with distilled water. The benzene layer was then dried by magnesium sulfate and the benzene was removed by distillation. The residue was refined by means of a silica gel column chromatography and recrystallization was conducted by using ethanol/methanol, whereby 1.20 g (2.85 mM) of trans-4-n-pentylcyclohexane carboxylate-p-2-fluorooctyloxyphenyl ester was obtained (yield 68.6%).

NMR data (ppm) 0.83–2.83 ppm (34 H, m) 4.00–4.50 ppm (2H, q) 7.11 ppm (4H, s)

IR data (cm$^{-1}$) 3456, 2982, 2852, 1742, 1508 1470, 1248, 1200, 1166, 1132, 854

Phase transition temperature (°C.)

extraction was conducted twice with 10 ml of methylene chloride. Subsequently, the extracted liquid was scrubbed with 10 ml of distilled water, whereby a methylene chloride solution was obtained. Then, anhydrous sodium sulfate was added to the methylene chloride solution for the purpose of drying, followed by removal of the solvent by distillation, thus obtaining 0.59 g (2.0 mmol) of (+)-2-fluoroheptyl p-toluene sulfonic acid ester.

The yield was 66%. The specific optical rotation degrees and IR data of the product are as follows.

Specific optical rotation degree $[\alpha]_D^{26.4} + 2.59°$ (c=1, CHCl$_3$)

Specific optical rotation degree $[\alpha]_{435}^{23.6} + 9.58°$ (c=1, CHCl$_3$)

IR (cm$^{-1}$) 2900, 2850, 1600, 1450, 1350, 1170, 1090, 980, 810, 660, 550

0.43 g (1.5 mmol) of the thus-obtained (+)-2-fluoroheptyl p-toluene sulfonic acid ester and 0.28 g (1.0 mmol) of 5-octyl-2-(4-hydroxyphenyl)pyrimidine were mixed together and 0.2 ml of 1-butanol was added to the mixture, followed by a sufficient stirring. Meanwhile, an alkali solution was prepared by dissolving 0.48 g (1.2 mmol) of sodium hydroxide to 1.0 ml of 1-butanol. The alkali solution was quickly added to the mixture and refluxed by being heated for 5.5 hours. After completion of the reaction, 10 ml of distilled water was added, followed by extractions with 10 ml and 5 ml of benzene, respectively. Then, a suitable amount of anhydrous sodium sulfate was added to the extracted liquid for the purpose of drying. Subsequently, the solvent was removed by distillation, and was refined by means of a silica gel column chromatography (chloroform),

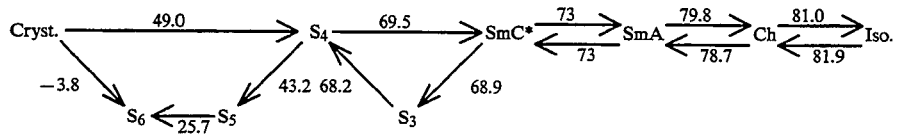

wherein S$_3$, S$_4$, S$_5$ and S$_6$ represent phase of greater degree of order than the SmC* phase.

SYNTHESIS EXAMPLE 6 (SYNTHESIS OF COMPOUND EXAMPLE NO. 3-85)

0.40 g (3.0 mmol) of (−)-2-fluoroheptanol and 1.00 g (13 mmol) of dried pyridine were charged in a vessel containing an atmosphere sufficiently substituted by nitrogen and were stirred for 30 minutes while being cooled by ice. After the addition of 0.69 g (3.6 mmol) of p-toluene sulfonic acid chloride, the mixture was further stirred for 5 hours. After completion of the reaction, 10 ml of 1N HCl was added to the mixture and whereby 0.17 g (0.43 m mol) of (+)-5-octyl-2-[4-(2-(2-fluoroheptyloxy)phenyl] pyrimidine was obtained.

The yield was 66%. The specific optical rotation degrees and IR data of the product are as follows.

Specific optical rotation degree $[\alpha]_D^{25.6} + 0.44°$ (c=1, CHCl$_3$)

Specific optical rotation degree $[\alpha]_{435}^{22.4} + 4.19°$ (c=1, CHCl$_3$)

IR (cm$^{-1}$) 2900, 2850, 1600, 1580, 1420, 1250 1160, 800, 720, 650, 550

Illustrative examples of the liquid crystal compounds having the general formula (III) are shown below.

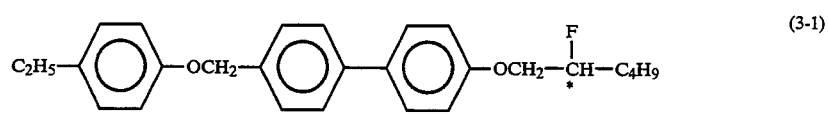

(3-1)

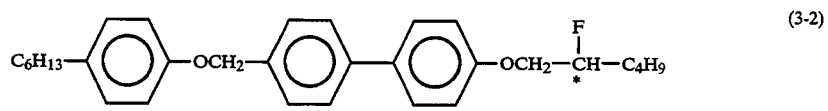

(3-2)

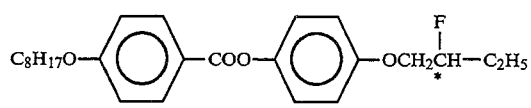 (3-3)
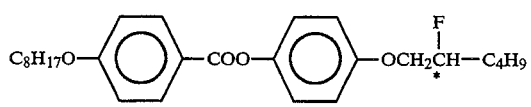 (3-4)
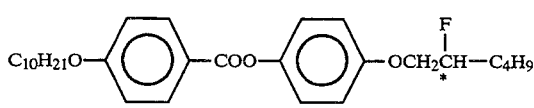 (3-5)
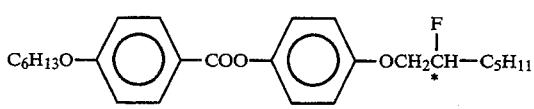 (3-6)
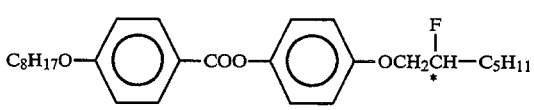 (3-7)
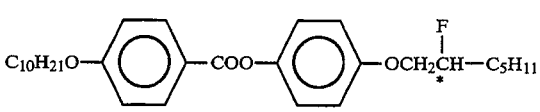 (3-8)
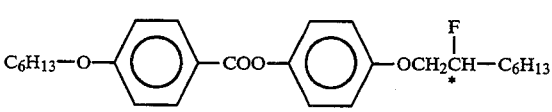 (3-9)
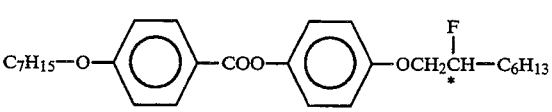 (3-10)
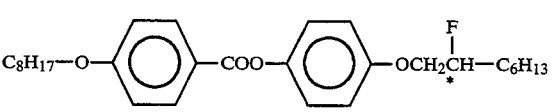 (3-11)
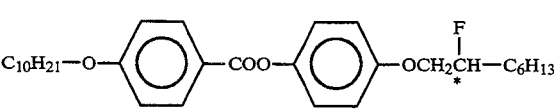 (3-12)
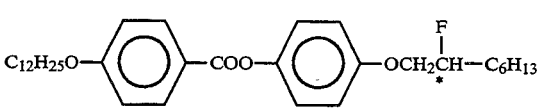 (3-13)
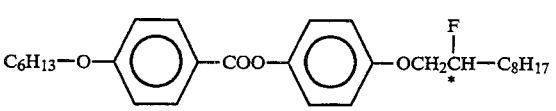 (3-14)
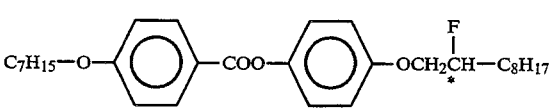 (3-15)
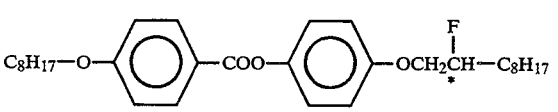 (3-16)

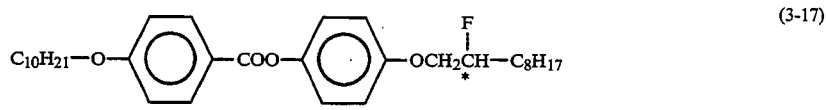
(3-17)
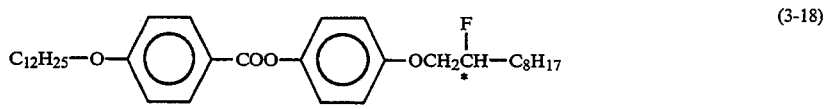
(3-18)
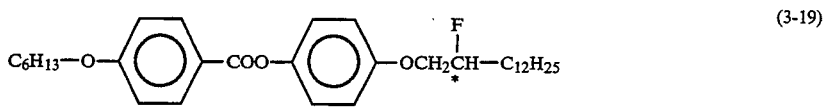
(3-19)
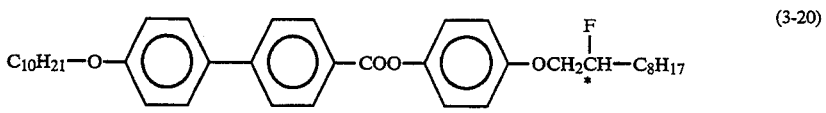
(3-20)
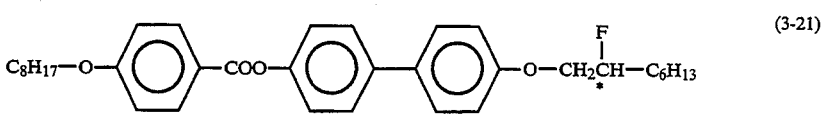
(3-21)
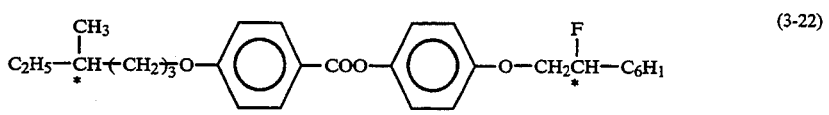
(3-22)
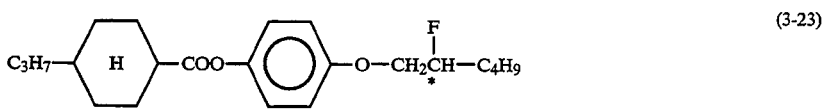
(3-23)
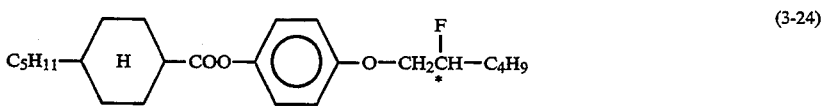
(3-24)
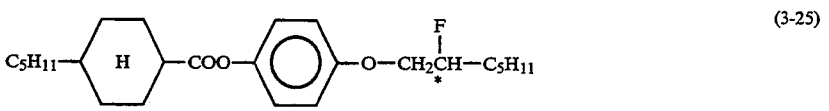
(3-25)
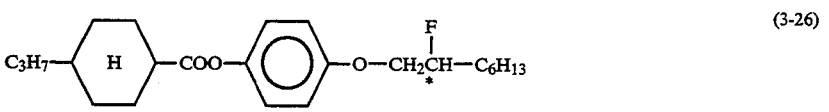
(3-26)
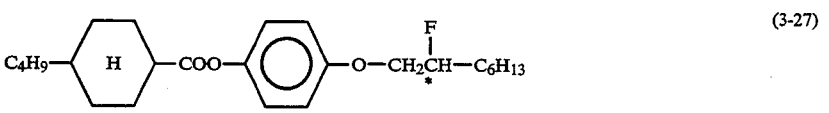
(3-27)
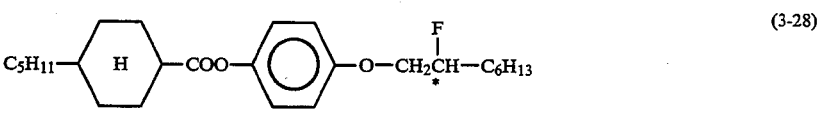
(3-28)
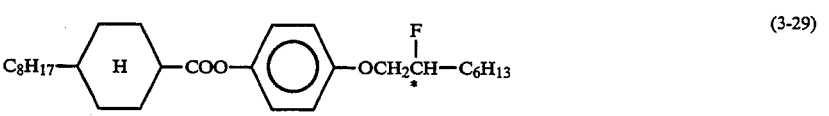
(3-29)

-continued
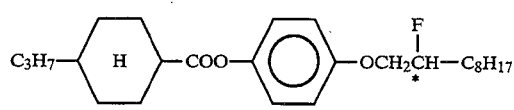 (3-30)
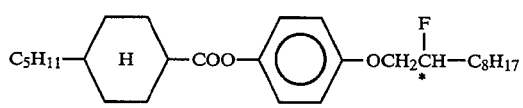 (3-31)
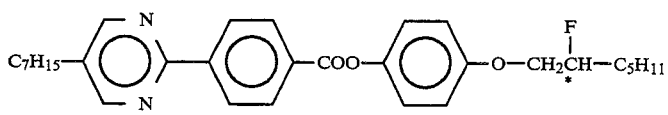 (3-32)
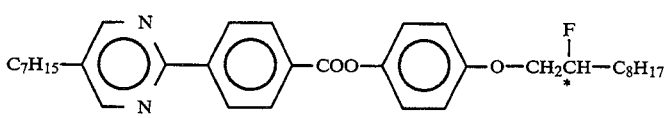 (3-32)
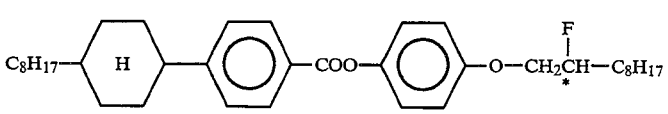 (3-33)
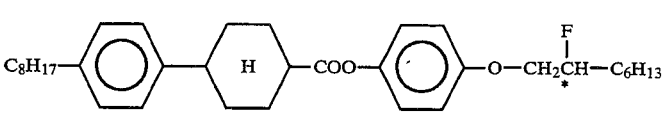 (3-34)
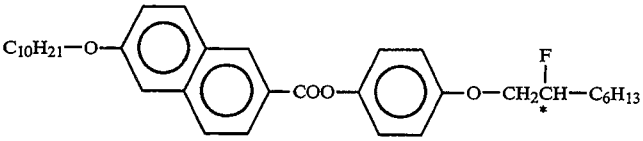 (3-35)
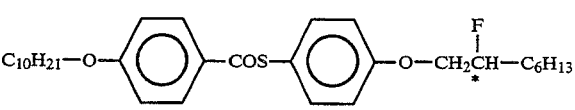 (3-36)
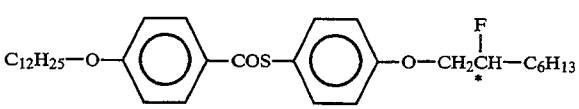 (3-37)
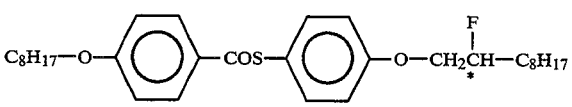 (3-38)
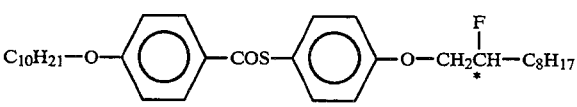 (3-39)
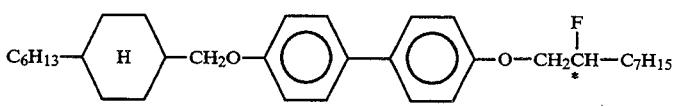 (3-40)
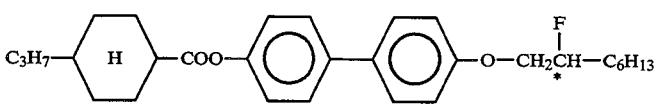 (3-41)

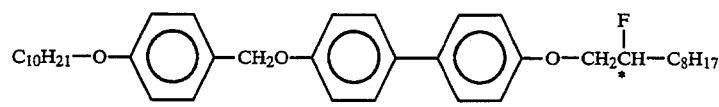 (3-42)
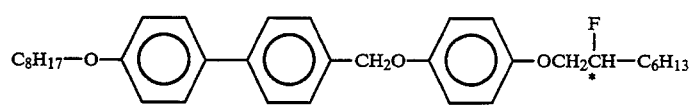 (3-43)
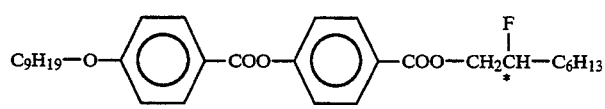 (3-44)
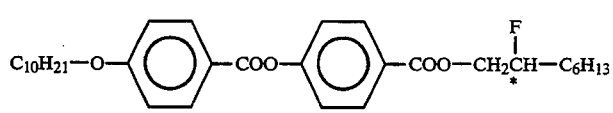 (3-45)
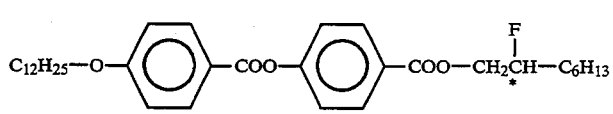 (3-46)
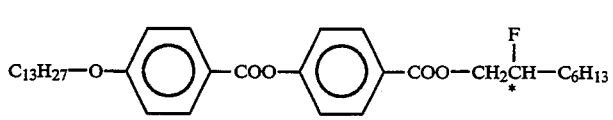 (3-47)
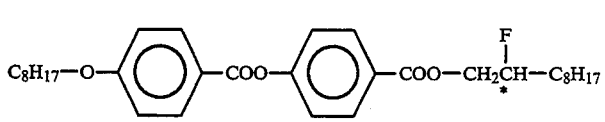 (3-48)
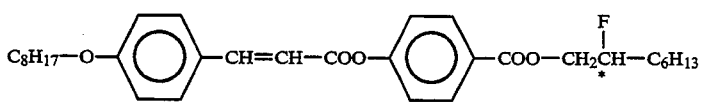 (3-49)
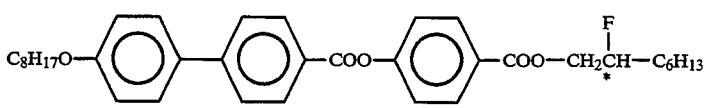 (3-50)
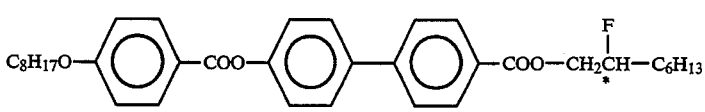 (3-52)
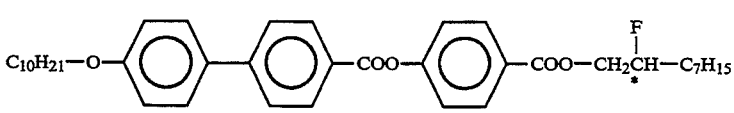 (3-53)
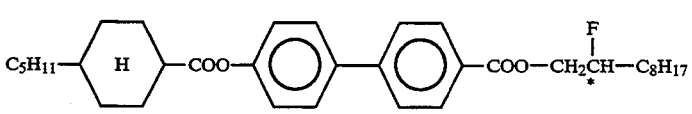 (3-54)
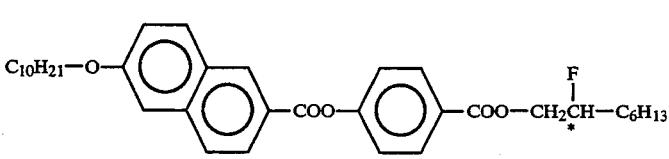 (3-55)

-continued
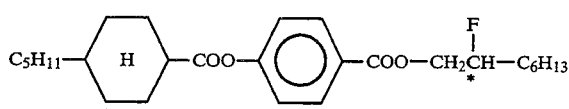 (3-56)
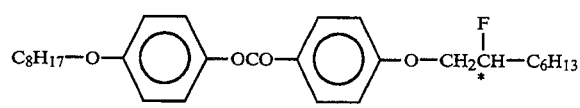 (3-57)
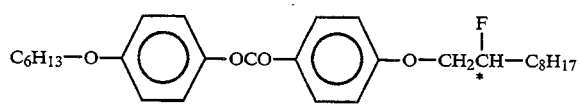 (3-58)
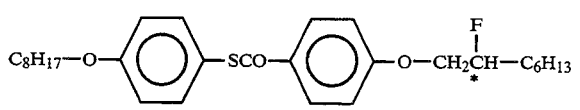 (3-59)
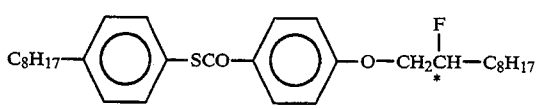 (3-60)
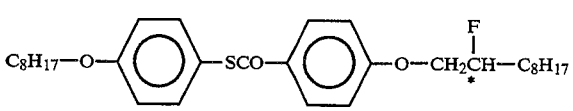 (3-61)
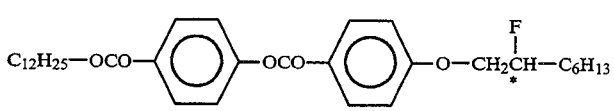 (3-62)
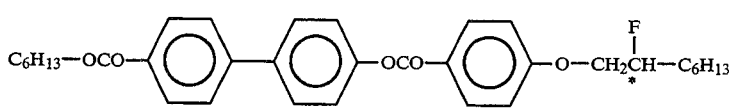 (3-63)
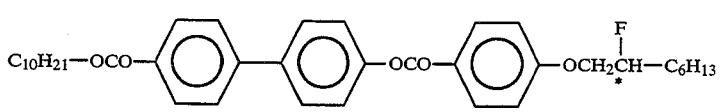 (3-64)
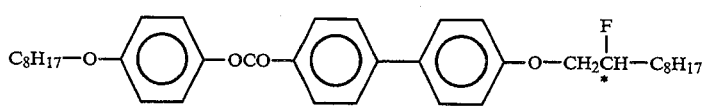 (3-65)
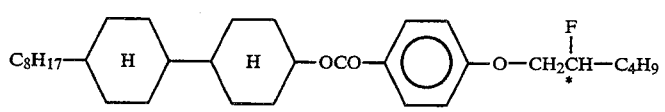 (3-66)
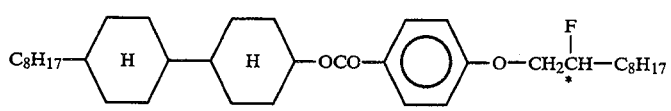 (3-67)
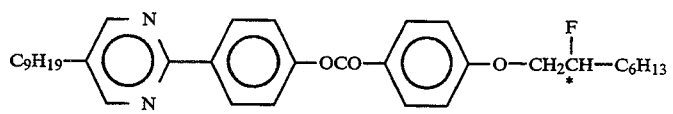 (3-68)

-continued
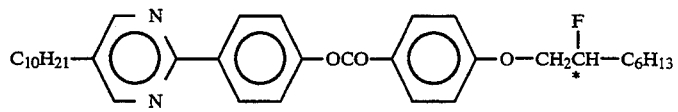 (3-69)
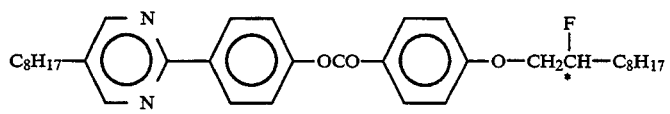 (3-70)
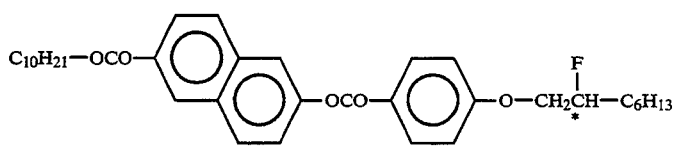 (3-71)
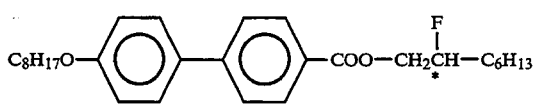 (3-72)
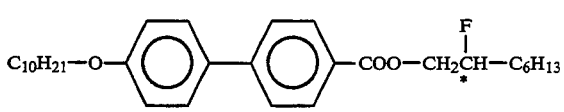 (3-73)
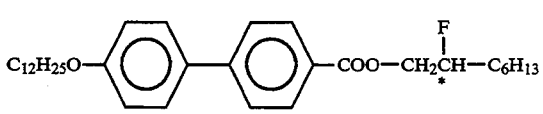 (3-74)
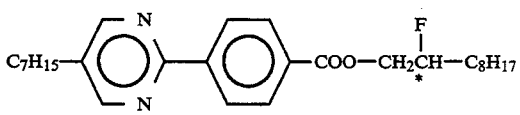 (3-75)
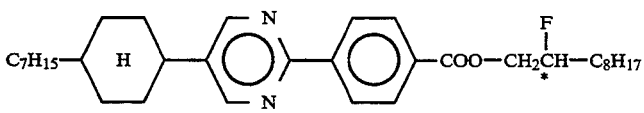 (3-76)
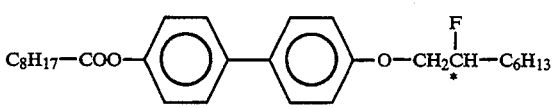 (3-77)
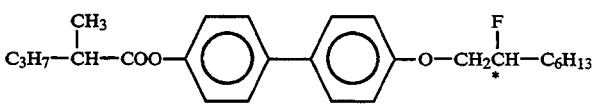 (3-78)
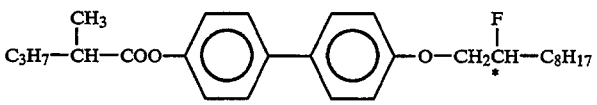 (3-79)
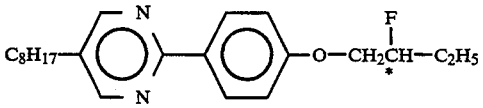 (3-80)
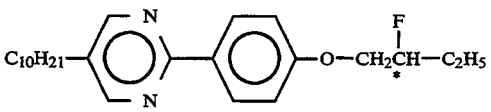 (3-81)

-continued
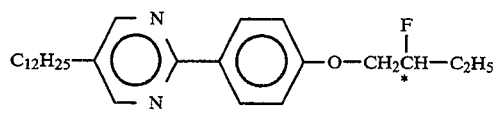 (3-82)
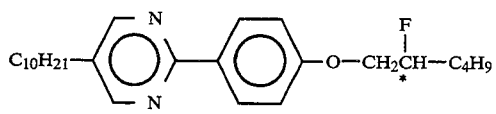 (3-83)
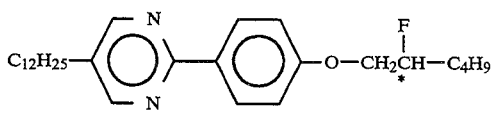 (3-84)
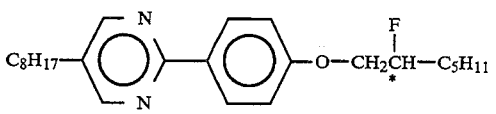 (3-85)
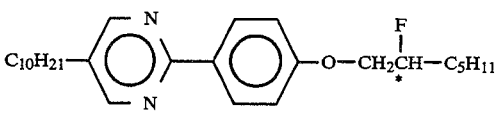 (3-86)
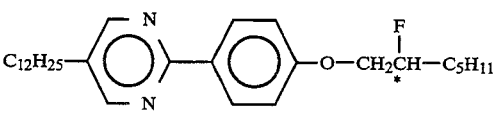 (3-87)
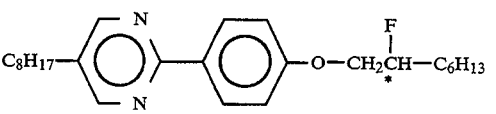 (3-88)
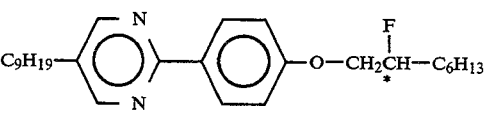 (3-89)
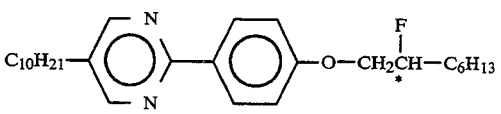 (3-90)
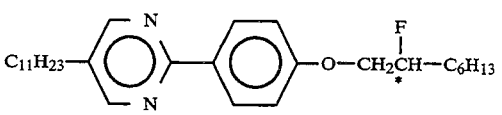 (3-91)
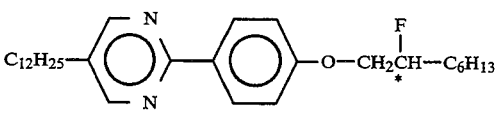 (3-92)
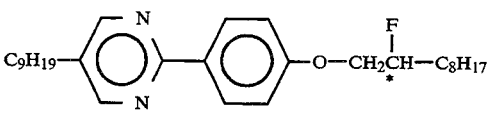 (3-93)
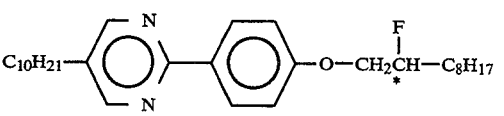 (3-94)

-continued
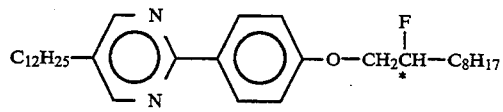 (3-95)
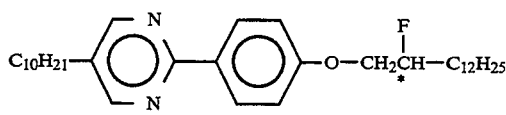 (3-96)
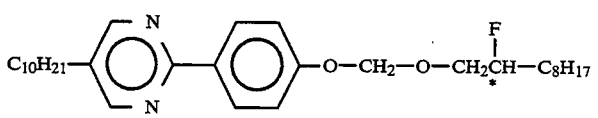 (3-97)
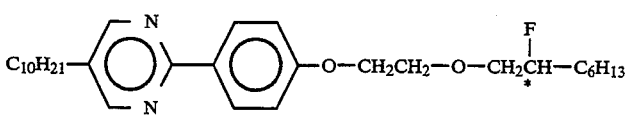 (3-98)
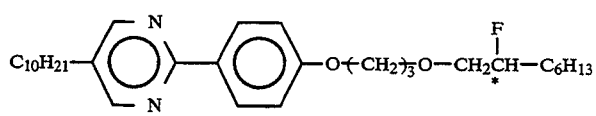 (3-99)
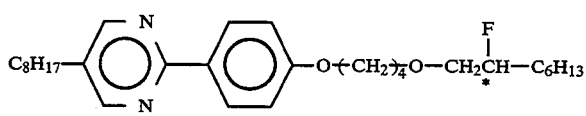 (3-100)
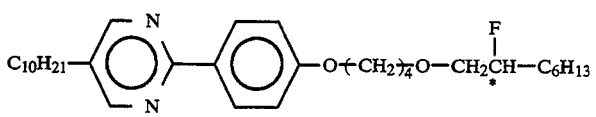 (3-101)
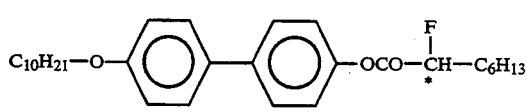 (3-102)
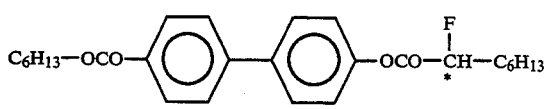 (3-103)
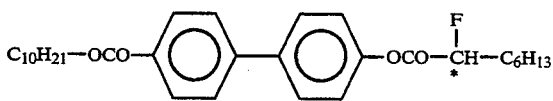 (3-104)
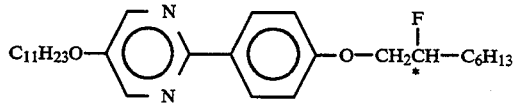 (3-105)
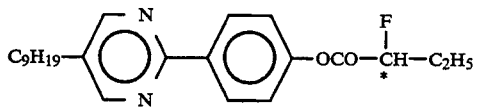 (3-106)
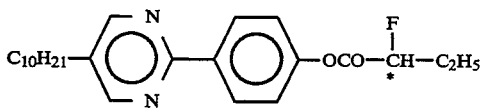 (3-107)

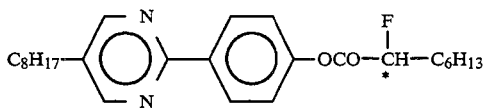
(3-108)

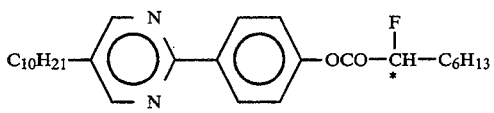
(3-109)

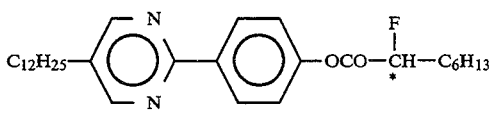
(3-110)

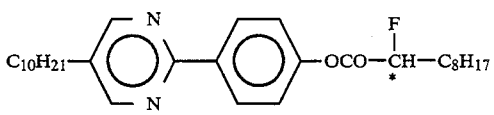
(3-111)

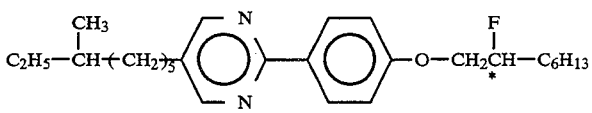
(3-112)

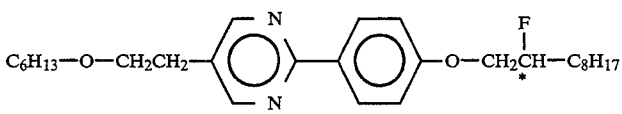
(3-113)

Preferably, the liquid crystal composition of the present invention contains the liquid crystal compounds of general formulae (I) and (II) in total amount of 1 to 90 wt %, more preferably 2 to 80 wt % and most preferably 4 to 80 wt % with respect to the total weight of the liquid crystal composition. The weight ratio between the liquid crystal compound of formula (I) and the liquid crystal compound of formula (II) generally ranges between 100:1 and 1:100, preferably between 70:1 and 1:70, more preferably between 30:1 and 1:30.

The above-mentioned total weight percents and weight ratios for the liquid crystal compounds of the formulae (I) and (II) in a liquid crystal composition preferably also apply to the embodiment where two or more types of compounds for at least one or both of the compounds having the formulae (I) and (II) are used in the liquid crystal composition.

It is also preferred that the liquid crystal composition of the present invention contains liquid crystal compounds having the general formulae (I), (II) and (III) in total amount of 1 to 99 wt %, more preferably 4 to 90 wt % and most preferably 6 to 80 wt % with respect to the total weight of the liquid crystal composition. The ratio of the content of the liquid crystal compound of the formula (III) to the total weight of the compounds of formulae (I) and (II) preferably ranges between 1:30 and 100:1, more preferably 1:20 and 50:1 and most preferably between 1:20 and 50:1, wherein the weight ratio of content between the compound of the formula (I) and the compound of the formula (II) falls within the above-mentioned ranges.

The above-mentioned total weight percents and weight ratios of the compounds of the formulae (I), (II) and (III) in a liquid crystal composition also apply to the embodiment where two or more types of compounds for at least one of the compounds having the formulae (I), (II) and (III) are used in the liquid crystal composition.

The liquid crystal composition according to the present invention exhibits ferroelectric characteristics. The phase exhibited by the liquid crystal composition is a chiral smectic phase.

Other liquid crystal compounds which are usable in the present invention are shown by the following general formulae (IV) to (VIII).

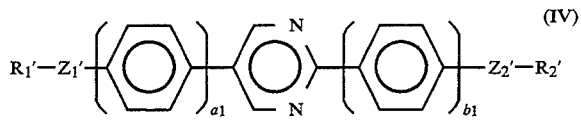
(IV)

wherein $R_1'$ and $R_2'$ each is a straight-chain or branched-chain alkyl group having 1 to 13 carbon atoms, in which one —$CH_2$— group or two or more —$CH_2$— groups which do not adjoin each other may be replaced by —CHCN—, —C—($CH_3$)—CN—, —CHCl or —CHBr—, and in which at least one —$CH_2$— group except those directly bonded to $Z_1'$ or $Z_2'$ may be replaced by —O—,

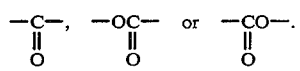

$Z_1'$ and $Z_2'$ each is a single bond, —O—,

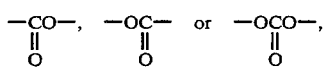

wherein $a_1$ and $b_1$ each is 0, 1 or 2 and $a_1+b_1$ equals to 1 or 2.

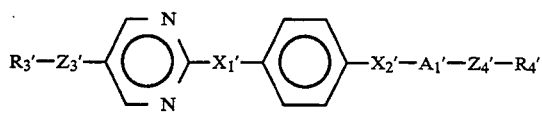
(V)

wherein $R_3'$ and $R_4'$ each is a straight-chain or branched-chain alkyl groups having 1 to 18 carbon atoms in which one —$CH_2$— group or two or more —$CH_2$— groups which do not adjoin each other may be replaced by —CHCN—, —C—($CH_3$)—CN—, —CHCl or —CHBr—, and in which at least one —$CH_2$— group except those directly bonded to $Z_3'$ or $Z_4'$ may be replaced by —O—,

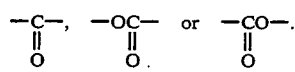

$Z_3'$ and $Z_4'$ each is a single bond, —O—,

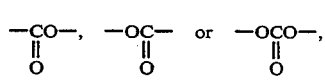

$X_1'$ and $X_2'$ each is a single bond,

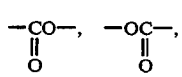

$CH_2O$— or $OCH_2$, wherein
$X_1'$ and $X_2'$ cannot both be single bonds.
$A_1'$ is

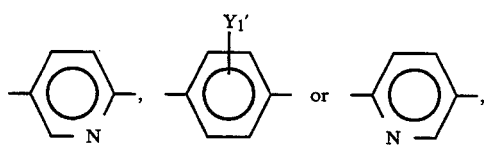

wherein $Y_1'$ is a hydrogen atom, halogen atom, $CH_3$ or $CF_3$.

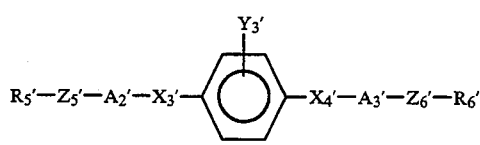
(VI)

wherein $R_5'$ and $R_6'$ each is a straight-chain or branched-chain alkyl group having 1 to 18 carbon atoms in which one —$CH_2$— group or two or more —$CH_2$— groups which do not adjoin each other may be replaced by —CHCN—, —C—($CH_3$)—CN—. —CHCl— or —CHBr—, and in which at least one —$CH_2$— group except those directly bonded to $Z_5'$ or $Z_6'$ may be replaced by —O—,

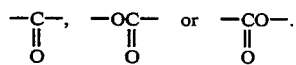

$A_2'$ is

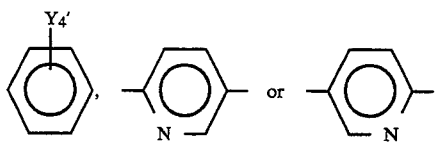

or a single bond.
$A_3'$ is

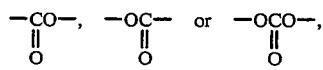

or a single bond, wherein $A_2'$ and $A_3'$ cannot both be single bonds.
$Z_5'$ and $Z_6'$ are a single bond, —O—,

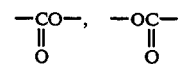

$X_3'$ and $X_4'$ each is a single bond,

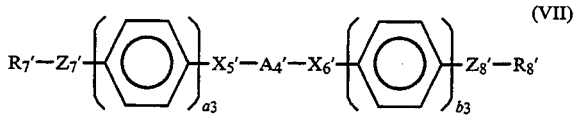

or —$CH_2O$—, wherein $X_3'$ is a single bond when $A_2'$ is a single bond, and $X_4'$ is a single bond when $A_3'$ is a single bond.
$Y_2'$, $Y_3'$ and $Y_4'$ each is a hydrogen atom, halogen atom, $CH_3$ or $CF_3$.

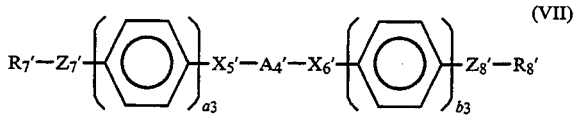
(VII)

wherein $R_7'$ and $R_8'$ each is a straight-chain or branched-chain alkyl group having 1 to 18 carbon atoms in which one —$CH_2$— group or more —$CH_2$— groups which do not adjoin each other may be substituted by —CHCN—, —C—($CH_3$)—CN—. —CHCl— or —CHBr—, and in which at least one —$CH_2$— group except those directly bonded to $Z_7'$ or $Z_8'$ may be replaced by —O—,

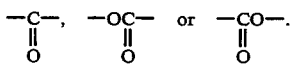

$A_4'$ is

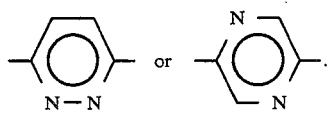

$Z_7'$ and $Z_8'$ each is a single bond, —O—,

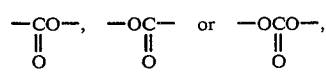

$X_5'$ and $X_6'$ each is a single bond,

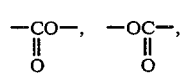

—CH$_2$O— or —OCH$_2$—, $a_3$ and $b_3$ each is 0 or 1 but cannot both be 0.

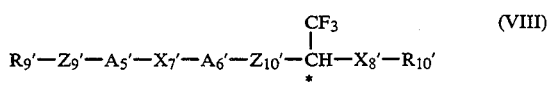 (VIII)

wherein $R_9'$ is a straight-chain or branched-chain alkyl group having 1 to 18 carbon atoms, $R_{10}'$ is a straight-chain or branched-chain alkyl group having 1 to 16 carbon atoms.

$A_5'$ is

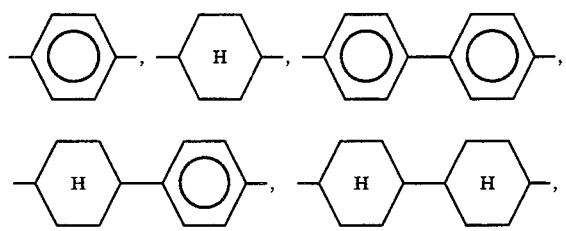

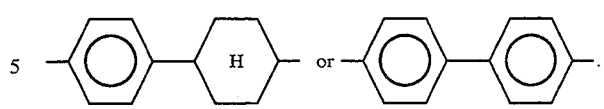

$A_6'$ is

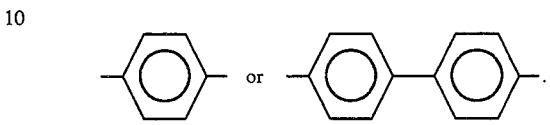

$X_7'$ is a single bond,

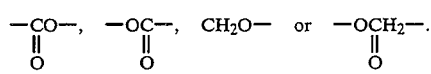

$X_8'$ is a single bond or —CH$_2$CO—.
$Z_9'$ is a single bond, —O—,

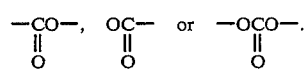

$Z_{10}'$ is

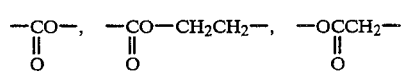

or —O—CH$_2$CH$_2$.

C* designates an optically inactive asymmetric carbon.

The following compounds (IV a) to (VIII e) are preferably used as the compounds of the formulae (IV) to (VIII).

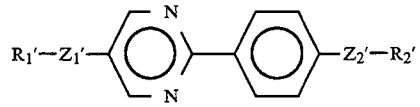 (IVa)

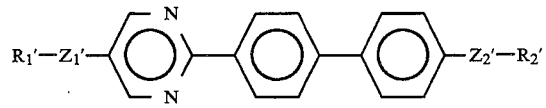 (IVb)

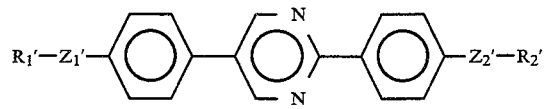 (IVc)

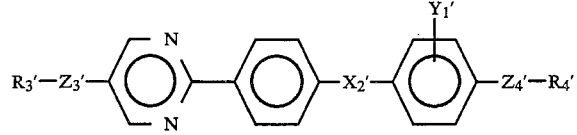 (Va)

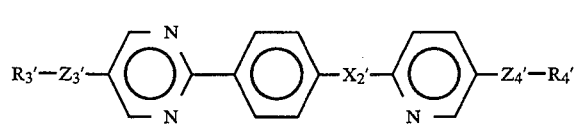 (Vb)

-continued
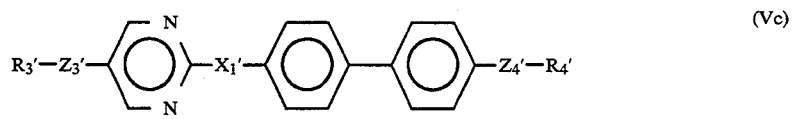 (Vc)
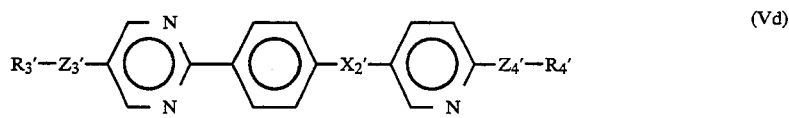 (Vd)
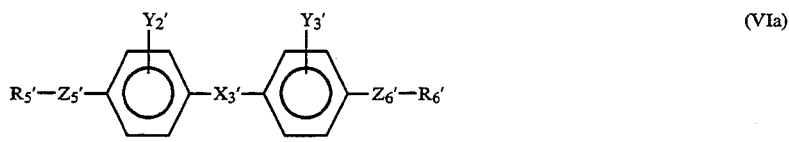 (VIa)
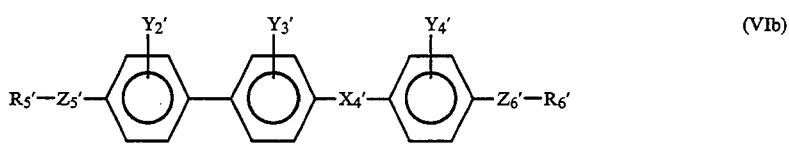 (VIb)
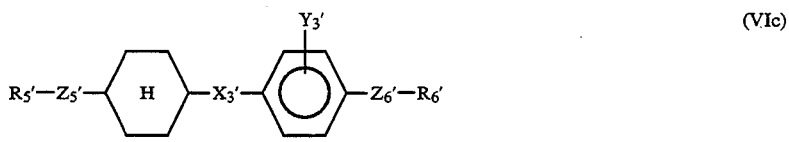 (VIc)
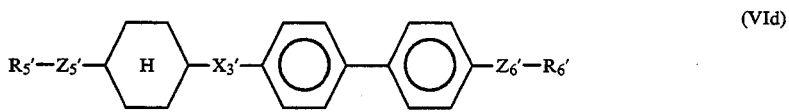 (VId)
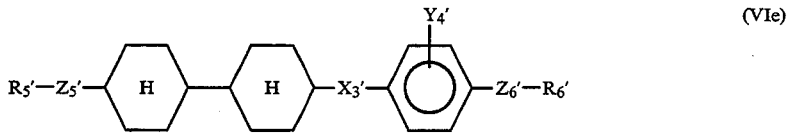 (VIe)
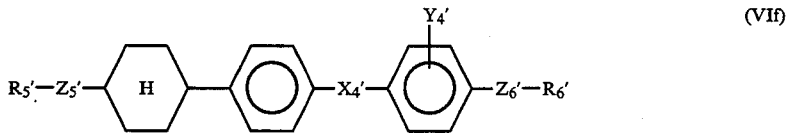 (VIf)
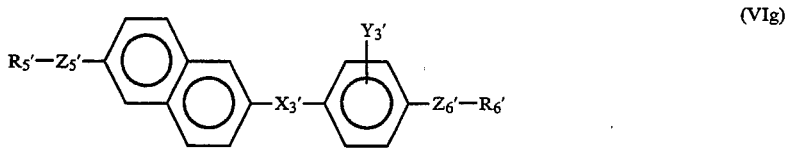 (VIg)
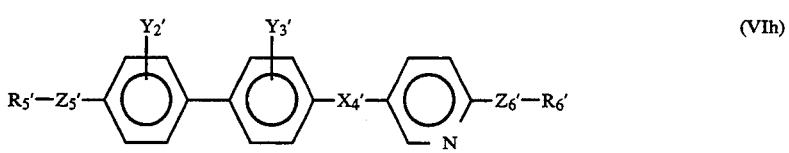 (VIh)
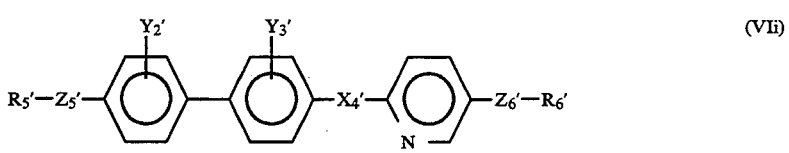 (VIi)

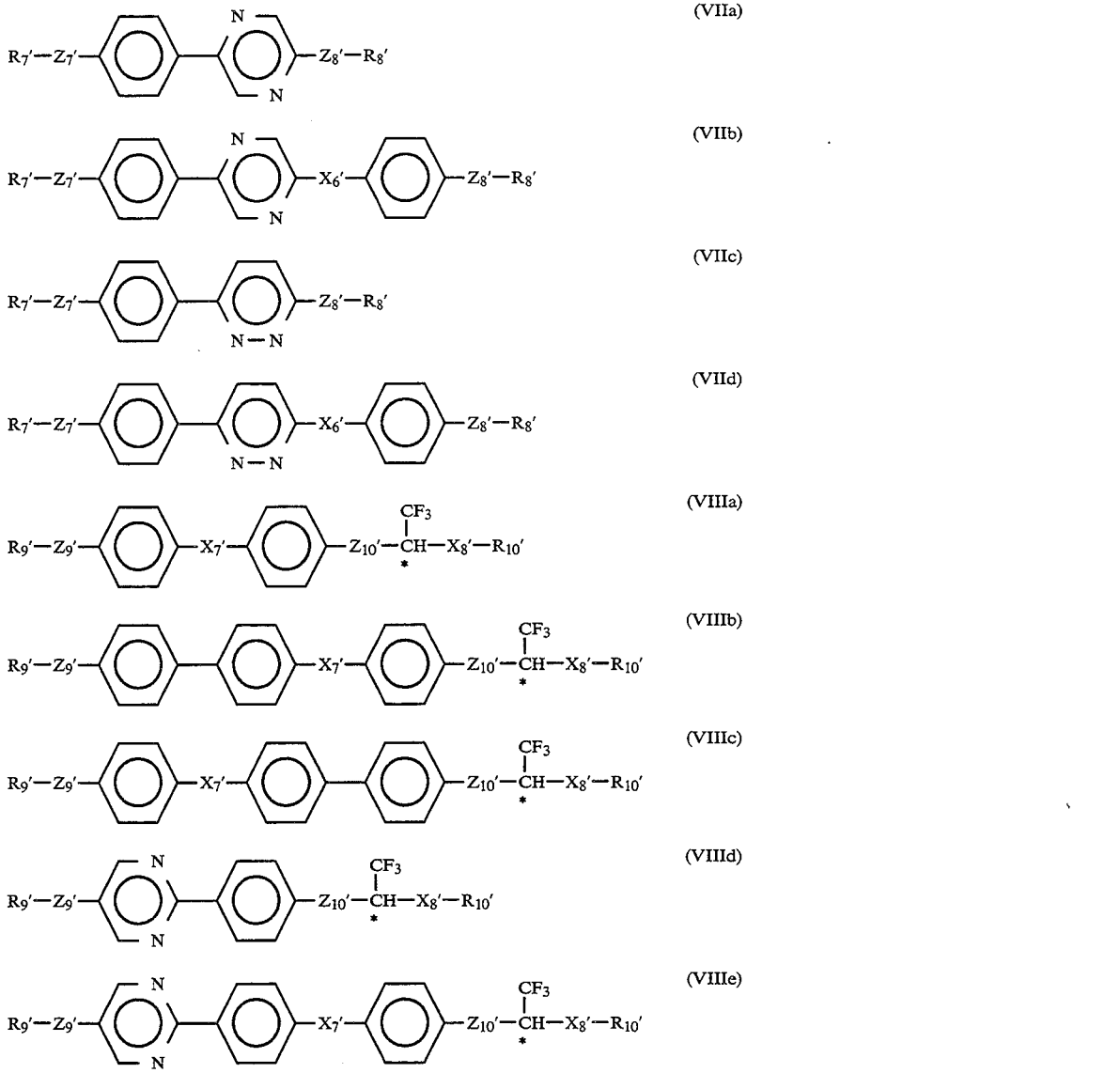

Preferably, the ferroelectric liquid crystal layer used in the ferroelectric liquid crystal device of the present invention is preferably produced by a process having the steps of preparing the described liquid crystal composition exhibiting chiral smectic phase, heating the liquid crystal composition to the isotropic liquid temperature in a vacuum, charging the heated liquid crystal composition in a cell, gradually cooling the liquid crystal layer so as to form a liquid crystal layer and then returning the atmospheric pressure.

FIG. 1 is a schematic sectional view of a liquid crystal device having a chiral smectic liquid crystal layer in accordance with the present invention and illustrative of the construction of a crystal device which uses ferroelectric characteristic.

Referring to FIG. 1, the liquid crystal device has a chiral smectic liquid crystal layer 1, glass substrates 2, transparent electrodes 3, insulating orientation control layers 4, a spacer 5, lead wires 6, a power supply 7, polarizing plates 8 and a light source 9.

The transparent electrode 3 is a thin film of $In_2O_3$, $SnO_2$ or ITO (Indium Tin Oxide) which covers the glass substrate 2. The insulating orientation control film 4, which is a thin film of a polymer such as polyimide, is formed on the transparent electrode 3. The insulating orientation control layer 4 is adapted to be rubbed with gauze or acetate cloth so as to orient the liquid crystal molecules in the direction of the rubbing. The insulating orientation control layer 4 may have a two-layered structure composed of an inorganic insulating material layer and an overlying orientation control layer of an organic insulating material.

Examples of the inorganic insulating material suitably used are silicon nitride, hydrogen-containing silicon carbide, silicon oxide, boronitride, hydrogen-containing boronitride, cerium oxide, aluminum oxide, zirconium oxide, titanium oxide and magnesium fluoride. Examples of the organic insulating material suitably used are polyvinyl alcohol, polyimide, polyamide imide, polyester imide, polyparaxylene, polyester, polycarbonate, polyvinyl acetal, polyvinyl chloride, polyvinyl acetate, polyamide, polystyrene, cellulose resin, melamine resin, urea resin, acrylic resin and photoresist resin.

The insulating orientation control layer maybe a single layer of an inorganic or organic insulating material. When an inorganic material is used, the insulating orientation control layer can be formed by, for example, evaporation deposition. When an organic insulating material is used, the insulating orientation control film can be formed by preparing a solution of the organic insulating material or its precursor solution (0.1 to 20 wt %, preferably 0.2 to 10 wt %), applying the solution by a suitable method such as spinner coating method, dip coating method, screen printing method, spray method or roll application method, and curing the solution under a suitable curing condition, e.g., by heating.

The thickness of the insulating orientation film usually ranges between 30 Å and 1 $\mu$m, preferably between 40 Å and 3000 Å and more preferably between 40 Å and 100 Å.

The pair of glass substrates 2 are spaced a predetermined distance by the spacer 5. For instance, silica beads or alumina beads of a predetermined diameter are used as the spacer. Such beads are clamped between the pair of glass substrates and the peripheral edges of the glass substrates are hermetically sealed by a suitable sealant such as an epoxy type bond. It is also possible to use a polymer film or glass fibers as the spacer. The ferroelectric liquid crystal is charged in the space between these glass substrates.

The chiral smectic liquid crystal layer 1 composed of the chiral smectic liquid crystal charged in the above-mentioned space has a thickness falling between 0.5 and 20 $\mu$m, preferably 1 and 5 $\mu$m.

The ferroelectric liquid crystal preferably has a chiral smectic C phase (SmC* phase) in a wide range of temperature including room temperature, particularly in low temperature range. This liquid crystal, when used in a device, is required also to have large margins of drive voltage and drive temperature.

Furthermore, this ferroelectric liquid crystal when used in a device is required to have high uniformity of orientation and highly uniform mono-domain state. To this end, the ferroelectric liquid crystal preferably has a phase transfer system in which the phase is changed from isotropic phase to Ch (cholesteric phase) and then to SmA (smectic phase) and finally to SmC* phase (chiral smectic C phase).

The transparent electrodes 3 are connected to the external power supply 7 through the lead wires 6. Polarizing plates 8 are adhered to the outer surfaces of the glass substrate 2. The light source 9 is used since the device shown in FIG. 1 is of transmission type.

Figure 2:
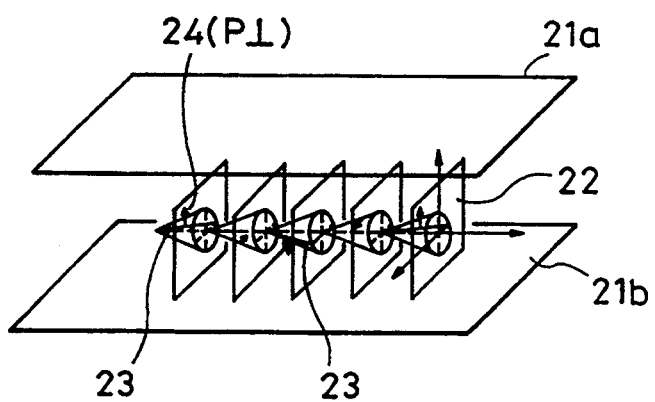
FIG. 2 is a schematic perspective view of an example of a liquid crystal cell, illustrative of the operation of a liquid crystal device which utilizes ferroelectric characteristics of a liquid crystal.

FIG. 2 schematically illustrates a liquid crystal cell for the purpose of explanation of operation of the liquid crystal device which utilizes the ferroelectric characteristic of the liquid crystal. A pair of substrates (glass sheets) 21a and 21b are covered by transparent electrodes made of $In_2O_3$, $SnO_2$ or ITO. A liquid crystal of SmC* or SmH* phase is charged in the space between the transparent electrodes. The liquid crystal is oriented such that the liquid crystal molecule layer 22 is perpendicular to the plane of the glass. Thick lines 23 represent the liquid crystal molecules. The liquid crystal molecule 23 has a bipolar moment (P$\perp$) 24 which acts in the direction orthogonal to the molecule axis. When a voltage exceeding a predetermined threshold voltage is applied between the electrodes on the substrates 21a, 21b, the spiral structure of the liquid crystal molecules 23 is loosened and the liquid crystal molecules 23 are oriented such that their bipolar moments (P$\perp$) are aligned in the direction of the electric field. The liquid crystal molecule 23 has an elongated form and has an anisotropy of refractive index, i.e., different refractive index values in the directions of its longer and shorter axes. Thus, a liquid crystal optical modulation device, which varies its optical characteristic in accordance with the polarity of voltage applied thereto, can easily be obtained by placing, for example, cross-nicol polarizers on the upper and lower sides of the upper and lower glass substrates.

Figure 3:
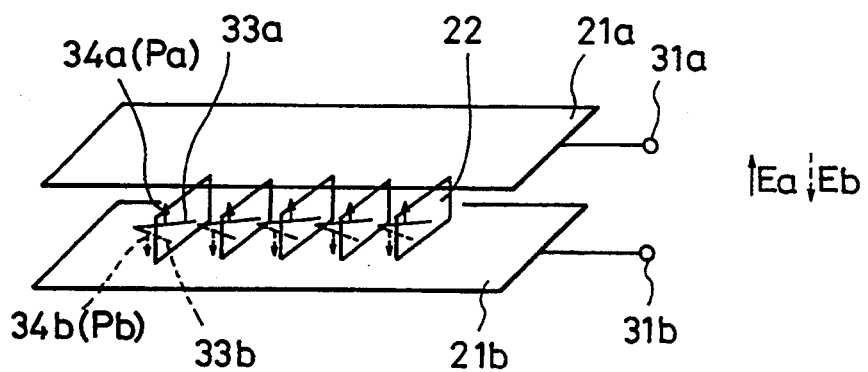
FIG. 3 is a schematic perspective view of another example of a liquid crystal cell, illustrative of the operation of a liquid crystal device which utilizes ferroelectric characteristics of a liquid crystal.

The liquid crystal cell preferably used in an optical modulation device embodying the present invention can have a very small thickness, e.g., 10 $\mu$m or less. When the thickness of the liquid crystal layer is reduced, the spiral structure of the liquid crystal molecules is loosened even in the absence of the electric field, as shown in FIG. 3. As a consequence, the liquid crystal molecules are set either to a state in which the bipolar moment Pa or Pb is directed upward as 34a or downward as 34b. When an electric field Ea or Eb of different polarity exceeding a predetermined threshold is applied by voltage application means 41a and 31b to the liquid crystal cell as shown in FIG. 3, the bipolar moment is directed upward as denoted by 34a or downward as denoted by 34b in accordance with the electric field vector of the electric field Ea or Eb, whereby the liquid crystal molecules are oriented either to a first stable state denoted by 33a or a second stable state 33b.

As explained before, the use of the ferroelectric characteristic in an optical modulation device offers the following two major advantages.

The first advantage is that the response speed is very high, while the second advantage is that the liquid crystal molecules exhibits bistable characteristics. The second advantage will be described in more detail with reference to FIG. 3. The liquid crystal molecules are oriented to the first stable state 33a in response to the electric field Ea. This state is maintained even after the electric field is turned off. Conversely, when a reverse electric field Eb is applied, the liquid crystal molecules are oriented to the second stable state 33b. This state also is maintained even after the electric field Eb is turned off. Thus, the liquid crystal molecules are held in the first or second stable states unless a reverse electric field Eb or Ea exceeding a predetermined threshold is applied to the cell.

Figure 9A:
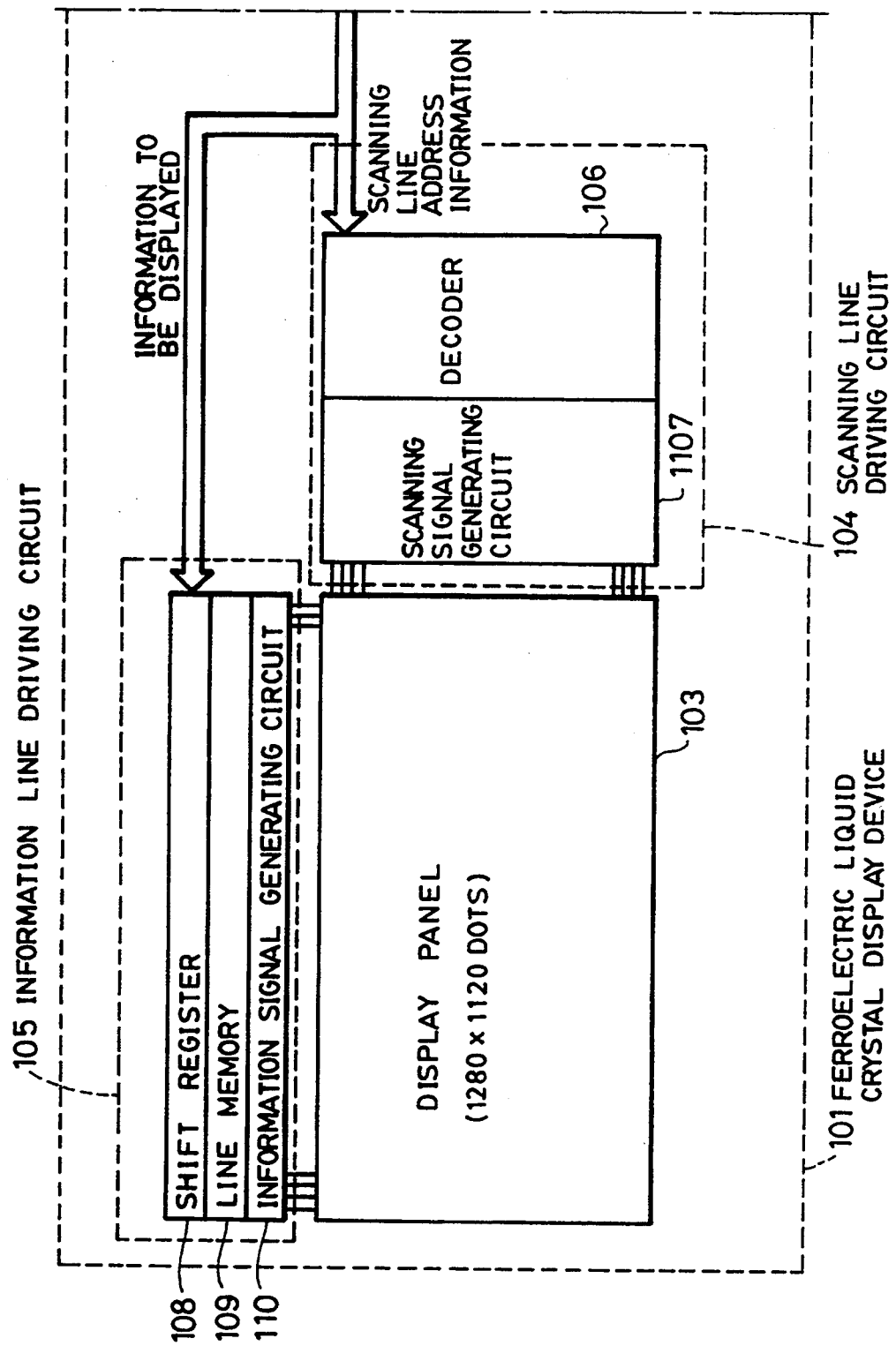
FIGS. 9a & b is a block diagram of a system including a liquid crystal display apparatus incorporating liquid crystal devices using ferroelectricity of a liquid crystal and a graphics controller.
Figure 9B:
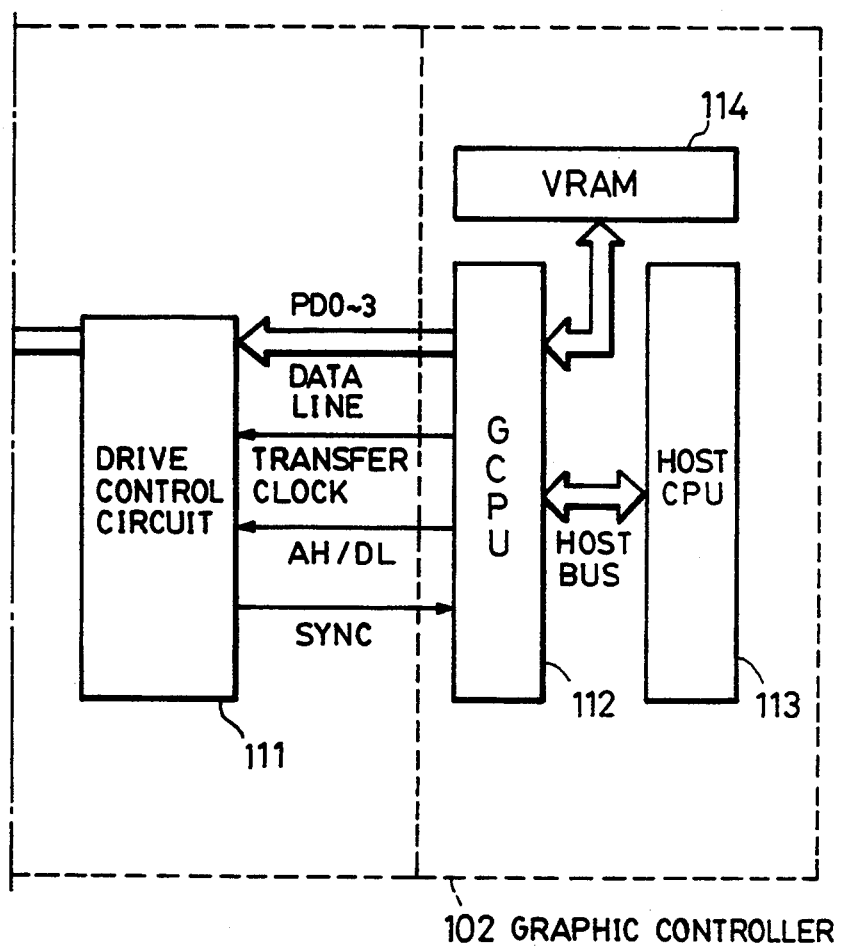
Figure 10:
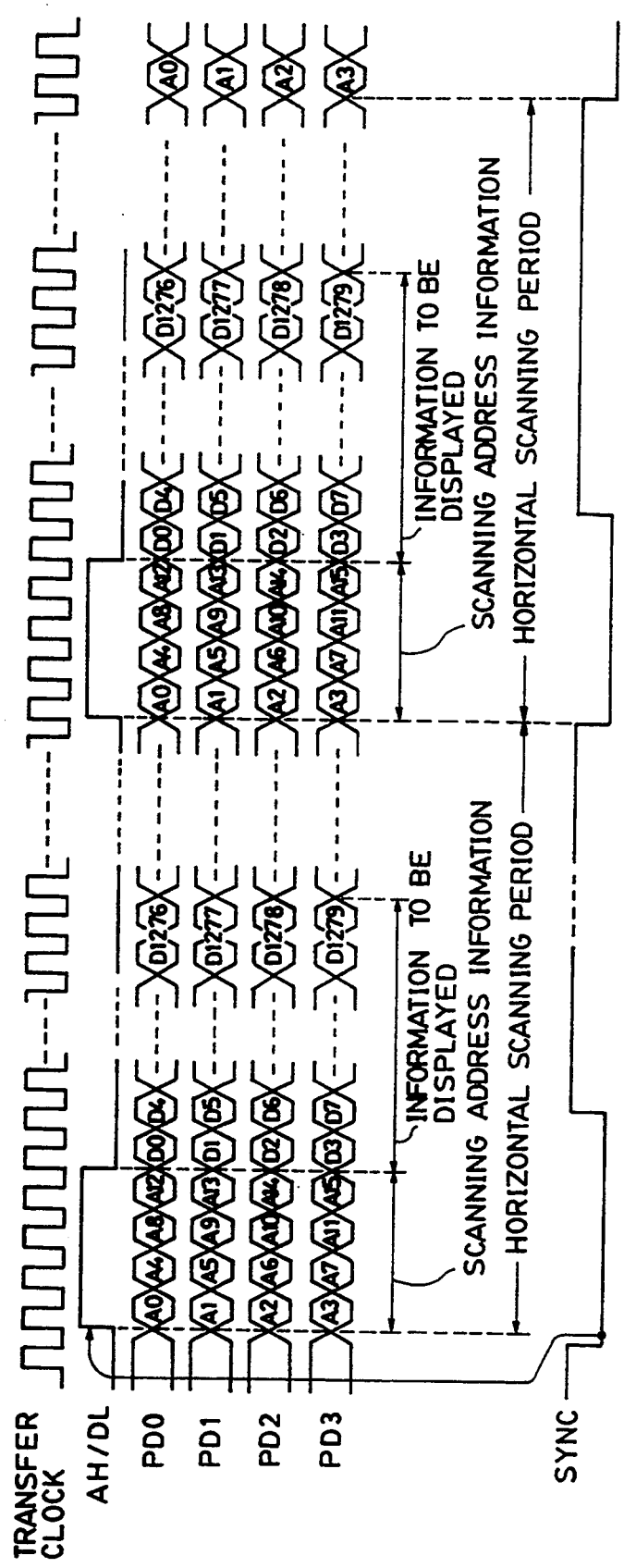
FIG. 10 is a timing chart illustrative of the timing of image information communication between the liquid crystal display apparatus and the graphics controller.

A liquid crystal display apparatus can be produced by using the liquid crystal devices of the invention as a display panel, in combination with a communication synchronizing means as shown in FIGS. 9 and 10 which processes data format carrying image information having scanning line address information in accordance with a synchronizing signal SYNC.

In FIGS. 9 and 10, the following numerals are used to denote the following components:

101: ferroelectric liquid crystal display device
102: graphic controller
103: display panel
104: scanning line driving circuit
105: information drive circuit
106: decoder
107: scanning signal generating circuit
108: shift register
109: line memory
110: information signal generating circuit
111: drive control circuit
112: GCPU
113: Host CPU

114: VRAM

Generation of image information is conducted by the graphics controller 102. The image information is transferred to the display panel 103 through the operation of signal transfer means shown in FIGS. 9 and 10. The graphics controller 102 is mainly composed of the graphics central processing unit GCPU 112 and the image information storage memory VRAM 114 and conducts administration and exchange of the image information between the host CPU 113 and the liquid crystal display device 101. The control method in accordance with the present invention is performed mainly by the graphics controller 102.

A light source is disposed on the rear side of the display panel.

The advantages of the present invention will be more fully understood from the following Examples. These Examples, however, are only illustrative and are not intended for limiting the scope of the invention. In the following Examples, the term "parts" means weight parts.

EXAMPLE 1

A liquid crystal composition A was prepared by mixing the following compounds at the following mixing ratios (weight parts).

| Compounds | Weight parts |
|---|---|
| $C_{10}H_{21}O-\bigcirc-COO-\bigcirc-OC_8H_{17}$ | 6 |
| $C_8H_{17}-\bigcirc-COO-\bigcirc-OC_{10}H_{21}$ | 8 |
| $C_{10}H_{21}O-\bigcirc-COO-\bigcirc-OC_6H_{13}$ | 9 |
| $C_{10}H_{21}-\bigcirc-COO-\bigcirc-OC_8H_{17}$ | 12 |
| $C_{10}H_{21}-\langle N{=}N\rangle-\bigcirc-O(CH_2)_3\overset{*}{C}H(CH_3)OC_3H_7$ | 3 |
| $C_{12}H_{25}O-\bigcirc-COS-\bigcirc-CH_2\overset{*}{C}H(CH_3)C_2H_5$ | 3 |
| $C_8H_{17}O-\bigcirc-COS-\bigcirc-OCH_2\overset{*}{C}H(CH_3)C_2H_5$ | 3 |
| $C_{10}H_{21}O-\bigcirc-COS-\bigcirc-OCH_2\overset{*}{C}H(CH_3)C_2H_5$ | 3 |
| $C_3H_7O\overset{*}{C}H(CH_3)(CH_2)_3O-\bigcirc-COO-\bigcirc-\bigcirc-COOC_6H_{13}$ | 15 |
| $C_4H_9OCH_2\overset{*}{C}H(CH_3)O-\bigcirc-COO-\bigcirc-\bigcirc-COOC_8H_{17}$ | 15 |

-continued

| Compounds | Weight parts |
|---|---|
| CH₃ substituted structure: C₂H₅OCH(*)−(CH₂)−O−⟨phenyl⟩−COO−⟨phenyl⟩−⟨pyrimidine N,N⟩−C₁₂H₂₅ | 8 |
| C₁₂H₂₅O−⟨phenyl⟩−COO−⟨phenyl⟩−COOCH₂CH(*)(CH₃)OC₅H₁₁ | 9 |
| C₁₂H₂₅O−⟨phenyl⟩−COO−⟨phenyl⟩−COOCH(*)(CF₃)CH₂COOC₂H₅ | 6 |

A liquid crystal composition 1-A was prepared by mixing the following compounds with the liquid crystal composition A at the following mixing ratios (weight parts).

| Compound Ex. No. | Compounds | Weight parts |
|---|---|---|
| 1-13 | C₉H₁₉−⟨pyrimidine⟩−⟨phenyl⟩−OC(=O)−C₇H₁₅ | 6 |
| 1-22 | C₁₀H₂₁−⟨pyrimidine⟩−⟨phenyl⟩−OC(=O)−C₈H₁₇ | 6 |
| 2-46 | C₄H₉−⟨thiophene⟩−CO−O−⟨phenyl⟩−⟨pyrimidine⟩−C₁₂H₂₅ | 6 |
| 2-53 | C₆H₁₃−⟨thiophene⟩−CO−O−⟨phenyl⟩−⟨pyrimidine⟩−C₁₂H₂₅ | 6 |

LIQUID CRYSTAL COMPOSITION A

Liquid crystal cells were produced by the following process by using liquid crystal compositions prepared in the Examples and optical response characteristics of the cells were examined.

An ITO film as a voltage application electrode was formed on each of a pair of glass sheets each having a thickness of 0.7 mm. Then, an $SiO_2$ film was formed by evaporation deposition on the ITO film. Subsequently, a 0.2% isopropyl alcohol solution of a silane coupling coupling agent (KBM-602, produced by Shinetsu Kagaku) was applied to the glass substrate for 15 seconds by means of a spinner operated at 2000 rpm, thus treating the surface of the glass sheets, followed by drying by being heated at 120° C. for 20 minutes.

Then 1.0% dimethylacetoamide solution of a polyimide precursor (SP-510, produced by Toray Industries) was applied to the surface-treated glass plate with ITO film, by means of a spinner operated at 3000 rpm for 15 seconds. After formation of this film, a condensation calcination treatment was conducted for 60 minutes at 300° C., whereby a coating film of 120 Å was obtained.

The calcined coating film was then subjected to s rubbing treatment in which it was rubbed with an acetate cloth. After a subsequent cleaning with an isopropyl alcohol solution, silica beads of a mean particle size of 1.5 μm were sprayed on one of the glass sheets and the other glass plate was placed on these beads such that the directions of axes of rubbing of both glass sheets are parallel to each other. Then, both glass sheets were bonded together by a bonding sealant (Lixon bond, produced by Chisso Co., Ltd.) and a 60-minute heating at 100° C. was conducted thus completing a cell. The thickness of the cell was about 1.5 μm when measured by a Bereck phase plate.

The liquid crystal composition 1-A, held in an isotropic liquid state, was charged in the above-mentioned cell and was cooled from the isotropic phase state down to 25° C. at a cooling rate of 20° C./h, whereby a ferroelectric liquid crystal device was obtained.

Figure 4:
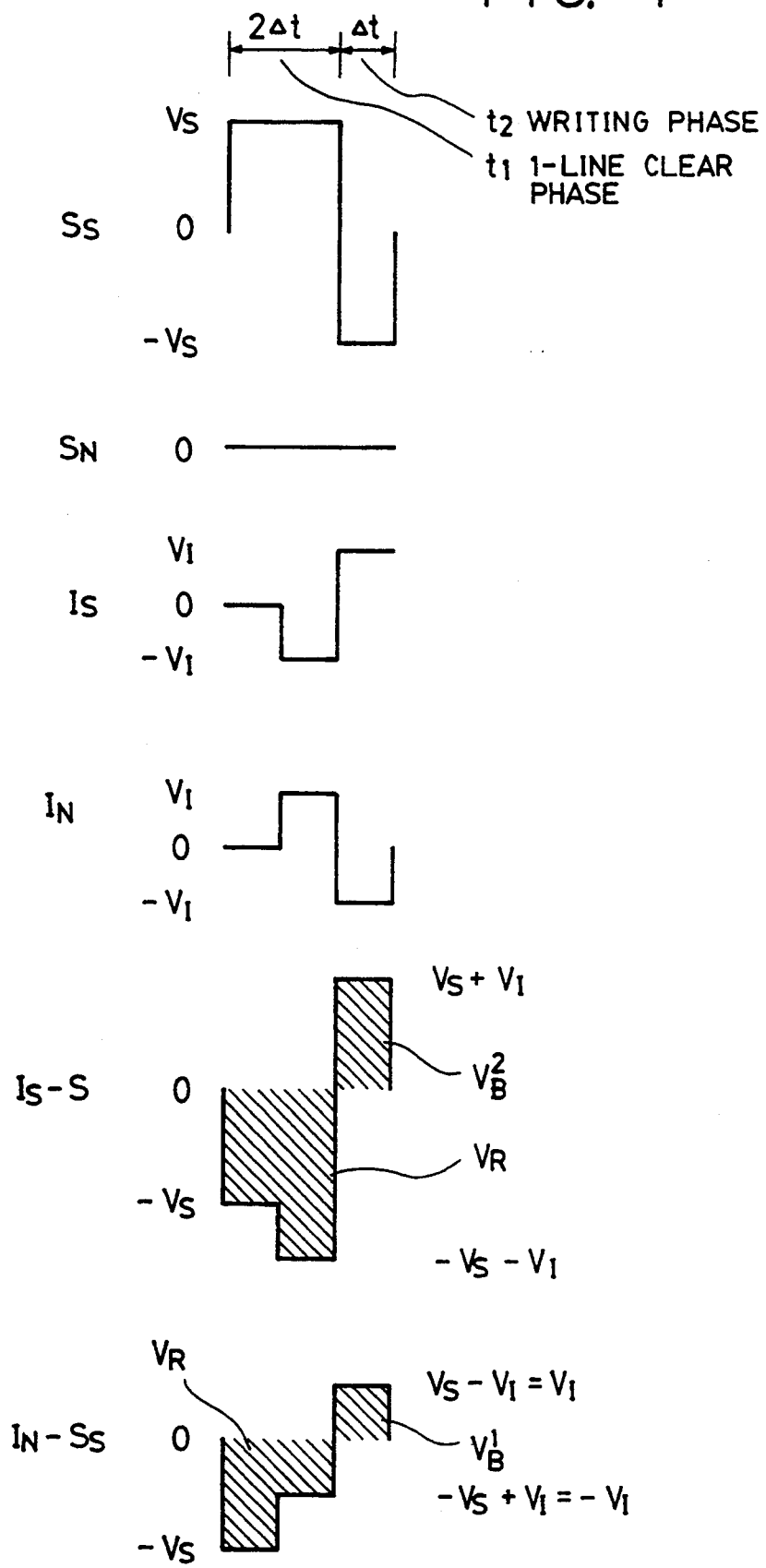
FIG. 4 is a waveform chart illustrative of a driving method for driving a liquid crystal device embodying the present invention.
Figure 5:
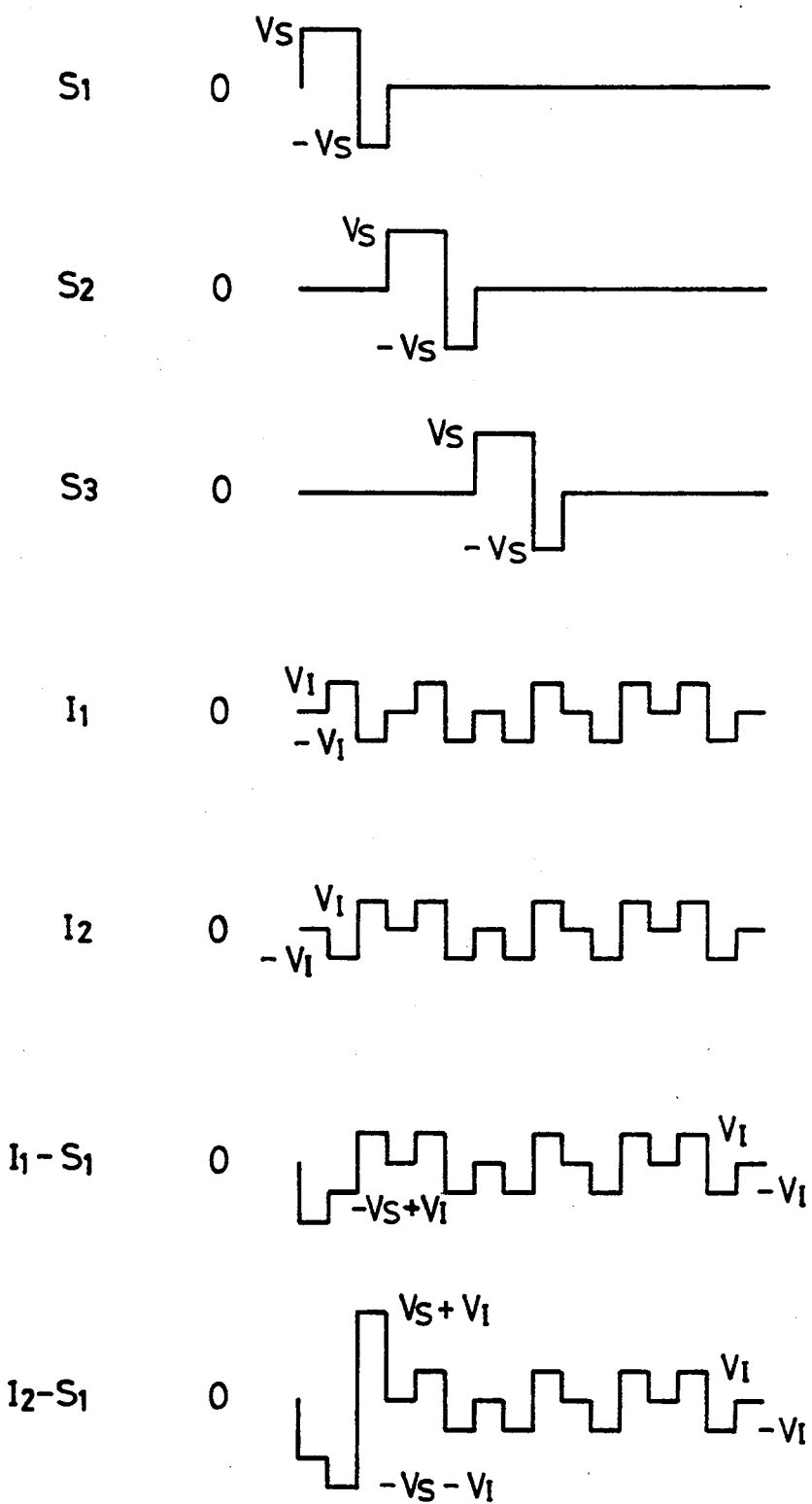
FIG. 5 is a waveform chart illustrative of another driving method for driving a liquid crystal device embodying the present invention.
Figure 6:
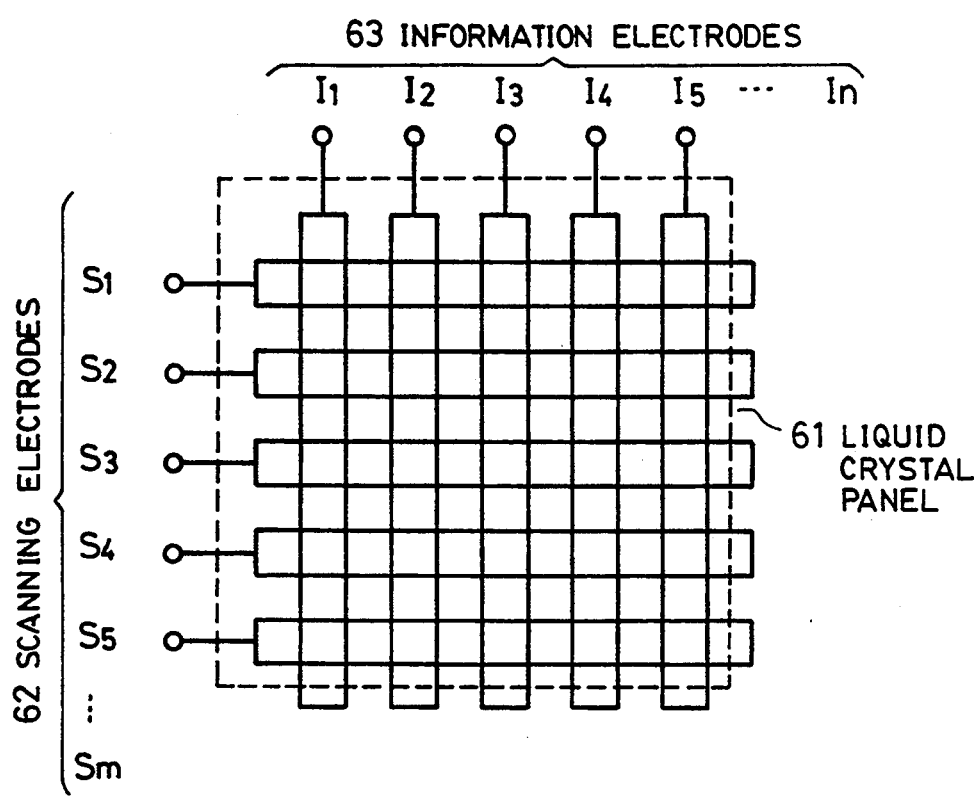
FIG. 6 is a plan view of a liquid crystal panel having matrix electrodes.
Figure 7:
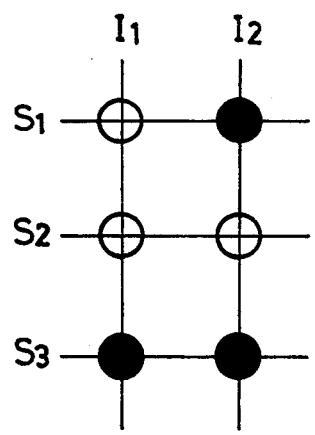
FIG. 7 is a schematic illustration of a display pattern formed when a liquid crystal display device of the present invention is driven by the time-sequential driving waveforms shown in FIG. 5.
Figure 8:
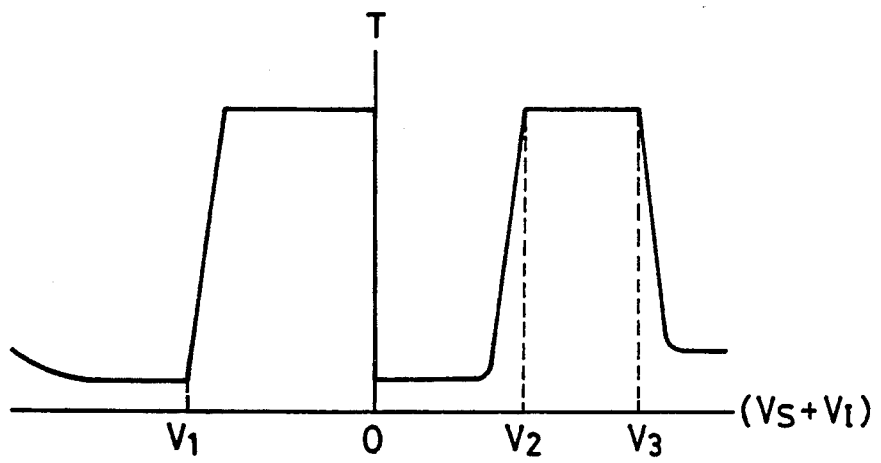
FIG. 8 is a V—T characteristic chart showing change in transmittance in relation to change in driving voltage.

Drive voltage margin $\Delta V$ (V3−V2) of the thus obtained ferroelectric liquid crystal device was measured with a driving waveform shown in FIG. 4 (⅓ bias ratio). The results are shown below. The measurement set time $\Delta t$ was determined such that the voltage V2 substantially equals to 15 V.

|  | 10° C. | 25° C. | 40° C. |
|---|---|---|---|
| Drive voltage margin | 13.2 V | 13.8 V | 13.1 V |
| Measurement set time Δt | 643 μsec | 222 μs | 85 μs |

The temperature range in which the ferroelectric liquid crystal device was drivable (referred to as "drive temperature margin" hereinafter) was also measured by setting the voltage at the central value of the drive voltage margin at 25° C. In this case, the drive temperature margin was measured to be ±4.2° C. The contrast measured with this voltage at 25° C. was 13.0.

COMPARATIVE EXAMPLE 1

Two types of liquid crystal compositions for Comparative Example 1 were prepared: a liquid crystal composition 1-AI which was formed by mixing only the compound example Nos. 1-13 and 1-22 with the liquid crystal composition A without adding the compound example Nos. 2-46 and 2-53, and a liquid crystal composition 1-AII which was formed by mixing only the compound example Nos. 2-46 and 2-53 with the liquid crystal composition A, without adding the compound example Nos. 1-13 and 1-22.

Ferroelectric liquid crystal devices were produced by the same process as Example 1 except that the liquid crystal compositions A, 1-AI and 1-AII were respectively charged in the cells in place of the liquid crystal composition 1-A, and the drive voltage margins ΔV of these devices were measured.

| Drive Voltage Margin and Measurement Set Time ΔT | | | |
|---|---|---|---|
|  | 10° C. | 25° C. | 40° C. |
| Liquid crystal composition A | 8.8 V | 8.8 V | 7.6 V |
|  | 850 μsec | 255 μs | 86 μs |
| Liquid crystal composition 1-AI | 9.0 V | 9.2 V | 8.5 V |
|  | 728 μsec | 233 μs | 81 μs |
| Liquid crystal composition 1-AII | 10.7 V | 11.0 V | 10.6 V |
|  | 785 μsec | 243 μs | 89 μs |

The drive temperature margin as measured at 25° C. were as follows.

| Liquid crystal composition A | ±1.4° C. |
|---|---|
| Liquid crystal composition 1-AI | ±2.6° C. |
| Liquid crystal composition 1-AII | ±3.4° C. |

As will be understood from the comparison between Example 1 and Comparative Example 1, the ferroelectric liquid crystal device having the liquid crystal composition 1-A of the present invention exhibits a greater margin of drive temperature margin than the devices having the liquid crystal compositions of Comparative Example 1, thus proving superior image forming performance against any change in the ambient air temperature and fluctuation in the gap between two substrates of the cells.

EXAMPLE 2

A liquid crystal composition 2-A was prepared by mixing the following compounds in addition to the compositions used in Example 1.

| Compound Ex. No. | Compounds | Weight parts |
|---|---|---|
| 3-28 | 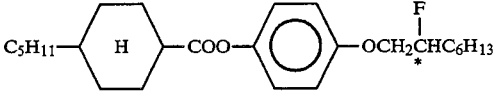 | 4 |
| 3-83 | 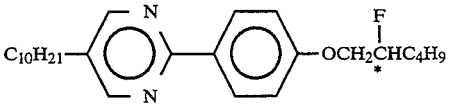 | 4 |
| 3-87 | 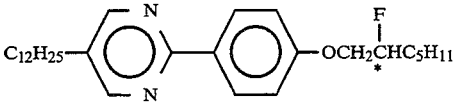 | 4 |
| 1-13 |  | 6 |
| 1-22 |  | 6 |
| 2-46 |  | 6 |
| 2-53 |  | 6 |
| Liquid crystal composition A |  | 64 |

A ferroelectric liquid crystal device was produced by the same process as Example 1 except that the liquid crystal composition 2-A was used, and drive voltage margin and drive temperature margin of this ferroelectric liquid crystal device were measured by the same method as Example 1. The results are shown below.

|  | 10° C. | 25° C. | 40° C. |
|---|---|---|---|
| Drive voltage margin | 13.0 V | 13.6 V | 12.9 V |
| (Measurement set time Δt) | 552 μsec | 202 μs | 74 μs |
| Drive temperature margin | ±4.0° C. | | |
| Contrast during driving | 12.5 | | |

COMPARATIVE EXAMPLE 2

Two types of liquid crystal compositions for Comparative Example 2 were prepared: a liquid crystal composition 2-AI which was formed by mixing only the compound example Nos. 1-13, 1-22, 3-28, 3-83 and 3-87 with the liquid crystal composition A at the same weight parts as Example 1 without adding the compound example Nos. 2-46 and 2-53, and a liquid crystal composition 2-AII which was formed by mixing only the compound example Nos. 2-46, 2-53, 3-28, 3-83, and 3-87 with the liquid crystal composition A, without adding the compound example Nos. 1-33 and 1-22.

Ferroelectric liquid crystal devices were produced by the same process as Example 1 except that the liquid crystal compositions A, 2-AI and 2-AII were respectively charged in the cells in place of the liquid crystal composition 2-A, and the drive voltage margins ΔV of these devices were measured.

| Drive Voltage Margin and Measurement Set Time ΔT | | | |
|---|---|---|---|
| | 10° C. | 25° C. | 40° C. |
| Liquid crystal composition A | 8.8 V | 8.8 V | 7.6 V |
| | 850 μsec | 255 μs | 86 μs |
| Liquid crystal composition 2-AI | 8.9 V | 9.1 V | 8.4 V |
| | 683 μsec | 218 μs | 75 μs |
| Liquid crystal composition 2-AII | 10.5 V | 10.8 V | 10.4 V |
| | 720 μsec | 255 μs | 81 μs |

The drive temperature margin as measured at 25° C. were as follows.

| | |
|---|---|
| Liquid crystal composition A | ±1.4° C. |
| Liquid crystal composition 2-AI | ±2.6° C. |
| Liquid crystal composition 2-AII | ±3.4° C. |

As will be understood from the comparison between Example 2 and Comparative Example 2, the ferroelectric liquid crystal device having the liquid crystal composition 2-A of the present invention exhibits a greater margin of drive temperature margin than the devices having the liquid crystal compositions of Comparative Example 2, thus proving superior image forming performance against any change in the ambient air temperature and fluctuation in the gap between two substrates of the cells.

EXAMPLE 3

A liquid crystal composition B was formed by mixing the following compounds at the following mixing ratios.

| Compounds | Weight parts |
|---|---|
|  | 4 |
| 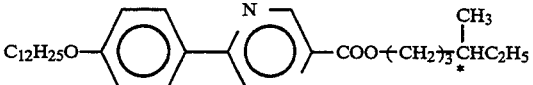 | 6 |
| 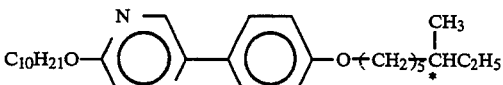 | 6 |
| 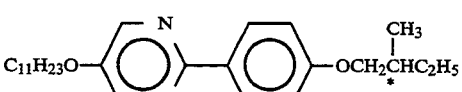 | 4 |
| 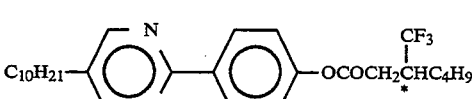 | 3 |
| 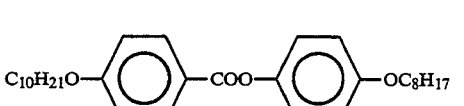 | 8 |
| 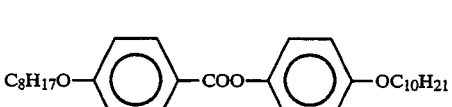 | 8 |
| 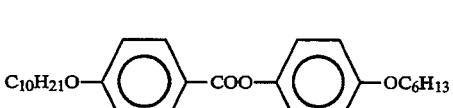 | 8 |
| 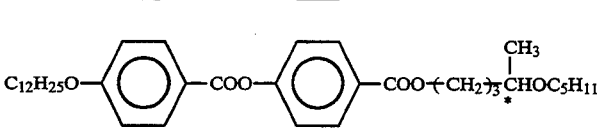 | 10 |

-continued
| Compounds | Weight parts |
|---|---|
| 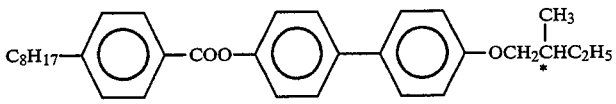 | 8 |
| 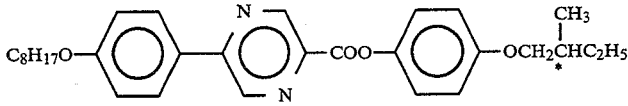 | 4 |
| 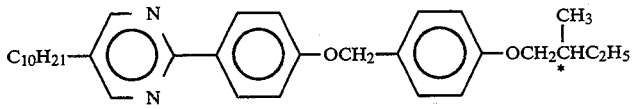 | 6 |
| 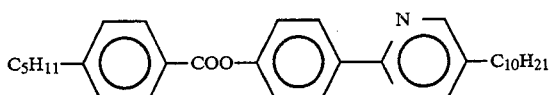 | 6 |
| 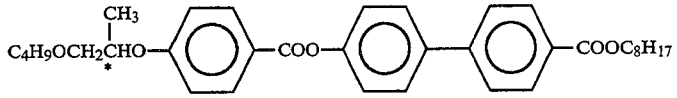 | 9 |
| 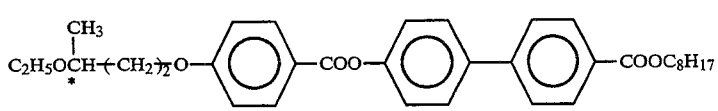 | 5 |
| 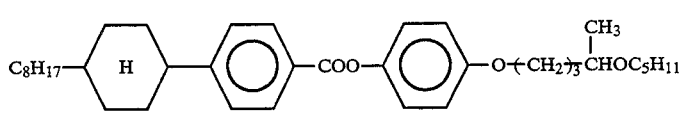 | 5 |
Then, a liquid crystal composition 3-B was prepared by mixing the following weight parts of the following compositions with the above-mentioned liquid crystal composition B.
| Compound Ex. Nos. | Compounds | Weight parts |
|---|---|---|
| 1-1 | 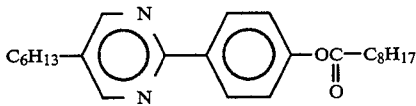 | 6 |
| 1-20 | 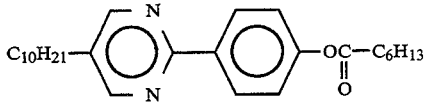 | 6 |
| 1-36 | 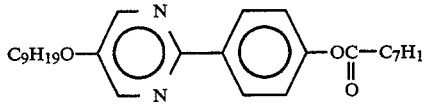 | 5 |
| 2-23 | 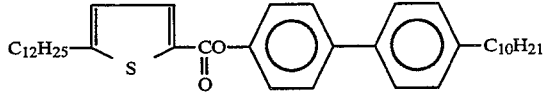 | 4 |

| Compound Ex. Nos. | Compounds | Weight parts |
|---|---|---|
| 2-70 | $C_{12}H_{25}$—⟨S⟩—CO—O—⟨phenyl⟩—⟨pyrimidine N,N⟩—$C_{10}H_{21}$ | 8 |
| 2-91 | $C_8H_{17}\overset{*}{C}H(F)CH_2O$—⟨S⟩—CO—O—⟨phenyl⟩—⟨pyrimidine N,N⟩—$C_4H_9$ | 3 |

LIQUID CRYSTAL COMPOSITION B

A ferroelectric liquid crystal device was produced by the same process as Example 1 except that liquid crystal composition 3-B was used. Drive voltage margin and drive temperature margin of the thus-produced liquid crystal device were measured by the same methods as those in Example 1. The results are shown below.

|  | 10° C. | 25° C. | 40° C. |
|---|---|---|---|
| Drive voltage margin | 12.7 V | 12.8 V | 12.4 V |
| Measurement set time $\Delta t$ | 400 μsec | 134 μs | 48 μs |
| Drive temperature margin | ±3.7° C. | | |
| Contrast during driving | 12.5 | | |

COMPARATIVE EXAMPLE 3

Two types of liquid crystal compositions for Comparative Example 3 were prepared: a liquid crystal Composition 3-BI which was formed by mixing only the compound example Nos. 1-1, 1-20 and 1-36 with the liquid crystal composition B at the same weight parts as Example 3 without adding the compound example Nos. 2-23, 2-70 and 2-91, and a liquid crystal composition 3-BII which was formed by mixing only the compound example Nos. 2-23, 2-70 and 2-91 with the liquid crystal composition B, without adding the compound example Nos. 1-1, 1-20 and 1-36.

Ferroelectric liquid crystal devices were produced by the same process as Example 3 except that the liquid crystal compositions B, 3-BI and 3-B2 were respectively charged in the cells in place of the liquid crystal composition 3-B, and the drive voltage margins $\Delta V$ of these devices were measured.

| Drive Voltage Margin and Measurement Set Time $\Delta T$ | | | |
|---|---|---|---|
|  | 10° C. | 25° C. | 40° C. |
| Liquid crystal composition B | 8.5 V | 9.0 V | 8.2 V |
|  | 508 μsec | 158 μs | 56 μs |
| Liquid crystal composition 3-B1 | 8.5 V | 9.1 V | 8.0 V |
|  | 428 μsec | 142 μs | 49 μs |
| Liquid crystal composition 3-B11 | 10.3 V | 10.6 V | 10.2 V |
|  | 458 μsec | 150 μs | 54 μs |

The drive temperature margin as measured at 25° C. were as follows.

| Liquid crystal composition B | ±2.0° C. |
|---|---|
| Liquid crystal composition 3-B1 | ±2.5° C. |
| Liquid crystal composition 3-B11 | ±3.2° C. |

As will be understood from the comparison between Example 3 and Comparative Example 3, the ferroelectric liquid crystal device having the liquid crystal composition 3-B of the present invention exhibits a greater margin of drive temperature margin than the devices having the liquid crystal compositions of Comparative Example 3, thus proving superior image forming performance against any change in the ambient air temperature and fluctuation in the gap between two substrates of the cells.

EXAMPLE 4

A liquid crystal composition 4-B was prepared by mixing the following compounds in addition to the compositions used in Example 3.

| Compound Ex. No. | Compounds | Weight parts |
|---|---|---|
| 3-37 | $C_{12}H_{25}O$—⟨phenyl⟩—COS—⟨phenyl⟩—$OCH_2\overset{*}{C}H(F)C_6H_{13}$ | 3 |
| 3-80 | $C_8H_{17}$—⟨pyrimidine N,N⟩—⟨phenyl⟩—$OCH_2\overset{*}{C}H(F)C_2H_5$ | 5 |
| 3-93 | $C_9H_{19}$—⟨pyrimidine N,N⟩—⟨phenyl⟩—$OCH_2\overset{*}{C}H(F)C_8H_{17}$ | 4 |
| 1-1 | | 6 |
| 1-20 | | 6 |

| Compound Ex. No. | Compounds | Weight parts |
|---|---|---|
| 1-36 | | 5 |
| 2-23 | | 4 |
| 2-70 | | 8 |
| 2-91 | | 3 |
| Liquid crystal composition B | | 56 |

A ferroelectric liquid crystal device was produced by the same process as Example 1 except that the liquid crystal composition 4-B was used, and drive voltage margin and drive temperature margin of this ferroelectric liquid crystal device were measured by the same method as Example 1. The results are shown below.

| | 10° C. | 25° C. | 40° C. |
|---|---|---|---|
| Drive voltage margin | 12.2 V | 12.5 V | 12.0 V |
| Measurement set time Δt | 320 μsec | 116 μs | 39 μs |
| Drive temperature margin | ±3.5° C. | | |
| Contrast during driving | 12.0 | | |

COMPARATIVE EXAMPLE 4

Two types of liquid crystal compositions for Comparative Example 4 were prepared: a liquid crystal Composition 4-B1 which was formed by mixing only the compound example Nos. 1-1, 1-20, 1-36, 3-37, 3-80 and 3-93 with the liquid crystal composition B at the same weight parts as Example 4 without adding the compound example Nos. 2-23, 2-70 and 2-91, and a liquid crystal composition 4-B11 which was formed by mixing only the compound example Nos. 2-23, 2-70, 2-91, 3-37, 3-80 and 3-93 with the liquid crystal composition B, without adding the compound example Nos. 1-1, 1-20 and 1-36.

Ferroelectric liquid crystal devices were produced by the same process as Example 4 except that the liquid crystal compositions B, 4-B1 and 4-B11 were respectively charged in the cells in place of the liquid crystal composition 4-B, and the drive voltage margins ΔV of these devices were measured.

| Drive Voltage Margin and Measurement Set Time ΔT | | | |
|---|---|---|---|
| | 10° C. | 25° C. | 40° C. |
| Liquid crystal composition B | 8.5 V | 9.0 V | 8.2 V |
| | 508 μsec | 158 μs | 56 μs |
| Liquid crystal composition 4-B1 | 8.5 V | 9.0 V | 8.0 V |
| | 369 μsec | 133 μs | 42 μs |
| Liquid crystal composition 4-B11 | 10.1 V | 10.1 V | 10.0 V |
| | 413 μsec | 139 μs | 47 μs |

The drive temperature margin as measured at 25° C. were as follows.

| Liquid crystal composition B | ±2.0° C. |
|---|---|
| Liquid crystal composition 4-B1 | ±2.1° C. |
| Liquid crystal composition 4-B11 | ±3.0° C. |

As will be understood from the comparison between Example 4 and Comparative Example 4, the ferroelectric liquid crystal device having the liquid crystal composition 4-B of the present invention exhibits a greater margin of drive temperature margin than the devices having the liquid crystal compositions of Comparative Example 4, thus proving superior image forming performance against any change in the ambient air temperature and fluctuation in the gap between two substrates of the cells.

EXAMPLE 5

A ferroelectric liquid crystal device was produced by the same process as Example 1 except that 2% aqueous solution of polyvinyl chloride resin (PVA-117, produced by Kuraray Col., Ltd.) was used in place of the 1.5% dimethyl acetoamide solution of polyimide precursor used in Example 1, and optical response speed of this ferroelectric liquid crystal device was measured by the same method as Example 1. The results being shown below.

| | 10° C. | 25° C. | 40° C. |
|---|---|---|---|
| Drive voltage margin | 13.3 V | 13.9 V | 13.2 V |
| Measurement set time Δt | 648 μsec | 225 μs | 86 μs |
| Drive temperature margin | ±4.3° C. | | |

EXAMPLE 6

A ferroelectric liquid crystal device was produced by the same process as Example 1 except that the orientation control layer was formed by polyimide resin alone without using SiO₂ employed in Example 1, and optical response speed of this ferroelectric liquid crystal device was measured by the same method as Example 1. The results being shown below.

| | 10° C. | 25° C. | 40° C. |
|---|---|---|---|
| Drive voltage margin | 13.1 V | 13.6 V | 13.0 V |
| Measurement set time Δt | 639 μsec | 220 μs | 84 μs |
| Drive temperature margin | ±4.1° C. | | |

EXAMPLES 7 TO 22

Liquid crystal compositions 7-A, 8-A, 9-A, 10-A, 11-A, 12A, 13-A, 14-A, 15-B, 16-B, 17-B, 18-B, 19-B, 20-B, 21-B and 22-B were prepared by using the compound examples and liquid crystal compositions shown in Table 1 in place of the compound examples and liquid crystal composition in Example 1 and the compound examples and liquid crystal composition used in Example 3. Liquid crystal devices were produced by the same process as Example 1 except that the above-mentioned liquid crystal compositions were used. Drive voltage margins and drive temperature margins of these liquid crystal devices were measured by the same methods as Example 1 and states of switching of these liquid crystal devices were examined.

These liquid crystal devices showed good states of orientation in their uniform mono-domains. The results of evaluation also are shown in Table 1.

TABLE 1

| Example No. (Name of composition) | Compound Nos- and Liquid Crystal Compositions Weight Parts | | | | | | | | Drive Volt. Margin $\nu$ 10° C. | 25° C. | 40° C. | 25° C. Drive Temp. Margin |
|---|---|---|---|---|---|---|---|---|---|---|---|---|
| 7     | 1-5  | 1-44 | 2-3  | 2-42  |       |       |      |   | A  | 13.2 | 13.7 | 13.0 | ±4.1° C. |
| (7-A) | 8    | 6    | 6    | 6     |       |       |      |   | 74 | 640  | 220  | 84   |          |
| 8     | 1-6  | 1-39 | 2-14 | 2-50  |       |       |      |   | A  | 13.1 | 13.5 | 12.9 | ±4.0° C. |
| (8-A) | 7    | 7    | 4    | 8     |       |       |      |   | 74 | 625  | 217  | 82   |          |
| 9     | 1-2  | 1-42 | 2-7  | 2-37  |       |       |      |   | A  | 13.2 | 13.6 | 13.0 | ±4.2° C. |
| (9-A) | 5    | 5    | 8    | 5     |       |       |      |   | 77 | 624  | 215  | 82   |          |
| 10    | 1-12 | 1-18 | 1-47 | 2-20  | 2-44  | 2-73  | 3-25 | 3-81 | A | 13.0 | 13.5 | 12.8 | ±3.9° C. |
| (10-A)| 4    | 5    | 6    | 3     | 5     | 5     | 5    | 5 | 62 | 548 | 200 | 73  |          |
| 11    | 1-17 | 1-37 | 2-37 | 2-47  | 2-75  | 3-6   | 3-85 |   | A  | 13.0 | 13.4 | 12.9 | ±3.9° C. |
| (11-A)| 6    | 6    | 4    | 8     | 2     | 5     | 5    |   | 64 | 545  | 198  | 73   |          |
| 12    | 1-19 | 1-45 | 2-2  | 2-76  | 3-20  | 3-82  |      |   | A  | 13.1 | 13.6 | 13.0 | ±4.0° C. |
| (12-A)| 7    | 6    | 5    | 8     | 3     | 7     |      |   | 64 | 548  | 202  | 74   |          |
| 13    | 1-7  | 1-40 | 2-56 | 2-95  | 3-40  | 3-90  | 3-106|   | A  | 13.2 | 13.8 | 13.1 | ±4.3° C. |
| (13-A)| 8    | 4    | 5    | 5     | 4     | 4     | 3    |   | 67 | 550  | 210  | 75   |          |
| 14    | 1-3  | 1-49 | 2-39 | 2-101 | 3-32  | 3-89  | 3-46 |   | A  | 13.1 | 13.5 | 12.9 | ±4.1° C. |
| (14-A)| 8    | 5    | 6    | 4     | 4     | 4     | 2    |   | 67 | 547  | 200  | 74   |          |
| 15    | 1-3  | 1-34 | 1-46 | 2-4   | 2-64  | 2-73  |      |   | B  | 12.9 | 13.0 | 12.7 | ±4.0° C. |
| (15-B)| 4    | 4    | 6    | 4     | 5     | 3     |      |   | 74 | 410  | 139  | 50   |          |
| 16    | 1-4  | 1-14 | 1-28 | 2-6   | 2-35  | 2-43  |      |   | B  | 12.6 | 12.7 | 12.2 | ±3.6° C. |
| (16-B)| 5    | 5    | 6    | 4     | 5     | 6     |      |   | 69 | 398  | 131  | 48   |          |
| 17    | 1-9  | 1-24 | 1-33 | 2-20  | 2-54  | 2-57  | 3-72 | 3-96 | B | 12.1 | 12.3 | 12.0 | ±3.5° C. |
| (17-B)| 6    | 6    | 6    | 3     | 5     | 5     | 5    | 5 | 59 | 315 | 112 | 38 |          |
| 18    | 1-8  | 1-31 | 1-38 | 2-15  | 2-62  | 2-80  | 3-77 | 3-86 | B | 12.2 | 12.4 | 12.2 | ±3.6° C. |
| (18-B)| 5    | 5    | 5    | 4     | 6     | 6     | 5    | 5 | 59 | 318 | 115 | 40 |          |
| 19    | 1-11 | 1-21 | 1-43 | 2-48  | 2-82  | 3-30  | 3-91 | 3-98 | B | 12.4 | 12.7 | 12.4 | ±4.0° C. |
| (19-B)| 4    | 6    | 4    | 6     | 6     | 2     | 4    | 4 | 64 | 338 | 120 | 41 |          |
| 20    | 1-10 | 1-27 | 1-32 | 2-45  | 2-86  | 3-16  | 3-84 |   | B  | 12.4 | 12.6 | 12.2 | ±3.9° C. |
| (20-B)| 4    | 4    | 6    | 5     | 5     | 6     | 6    |   | 64 | 325  | 115  | 40   |          |
| 21    | 1-15 | 1-32 | 1-50 | 2-51  | 2-88  | 2-111 | 3-88 | 3-94 | B | 12.1 | 12.4 | 12.1 | ±3.7° C. |
| (21-B)| 5    | 5    | 5    | 5     | 5     | 3     | 5    | 5 | 62 | 315 | 109 | 38 |          |
| 22    | 1-24 | 1-29 | 1-35 | 2-52  | 2-60  | 3-92  | 3-95 |   | B  | 12.2 | 12.5 | 12.1 | ±3.8° C. |
| (22-B)| 6    | 4    | 5    | 5     | 7     | 6     | 6    |   | 61 | 322  | 118  | 40   |          |

As will be seen from Table 1, all the examples Nos. 7 to 22, having liquid crystal compositions in accordance with the present invention, exhibit good orientation characteristics and widened ranges of drive voltage margin and drive temperature margin, thus proving ability to produce and maintain images of high quality against any change in the ambient air temperature and fluctuation in the cell gap.

It is also understood that the liquid crystal device containing the liquid crystal composition of the present invention exhibits a reduced temperature-dependency of the response speed, as can be seen from the values of the measurement set pulse width Δt shown in Table 1.

It is therefore expected that practicalization of ferroelectric liquid crystal devices is greatly promoted by the use of the liquid crystal compositions of present invention.

As will be understood from the foregoing description, the liquid crystal device using the liquid crystal compositions of the present invention exhibits superior switching characteristic, as well as large margin of the drive voltage. In addition, the liquid crystal device exhibits a widened range of drive temperature margin so that all pixels of a matrix can be driven substantially equally despite any local temperature deviation in the display area of the liquid crystal device.

It will be also clear that a superior liquid crystal display apparatus can be obtained by combining the described liquid crystal display device with a light source, drive circuit and other necessary devices.

While the present invention has been described with respect to what is presently considered to be the preferred embodiments, it is to be understood that the invention is not limited to the disclosed embodiments. On the contrary, the invention is intended to cover various modifications and equivalents included within the spirit and scope of the appended claims.

What is claimed is:

1. A liquid crystal composition comprising, at least one type of liquid crystal compound having formula (I) and at least one type of liquid crystal compound having formula (II):

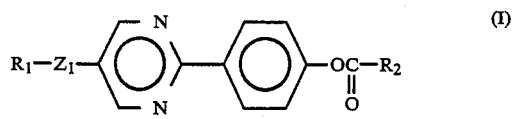

(I)

wherein $R_1$ and $R_2$ each is an optically inactive straight-chain or branched-chain alkyl group having 1 to 18 carbon atoms which may have an alkoxy group having 1 to 14 carbon atoms; $Z_1$ is —O—,

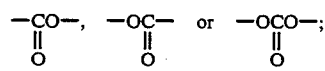

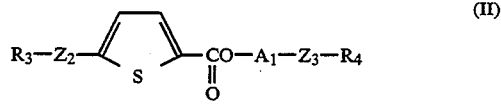

(II)

wherein $R_3$ and $R_4$ each is straight-chain or branched-chain alkyl group having 1 to 18 carbon atoms which may be substituted with alkoxy group having 1 to 12 carbon atoms or F; $Z_2$ and $Z_3$ each is a single bond,

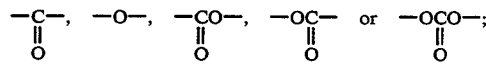

$A_1$ is —$A_2$— or —$A_2$—$A_3$—, wherein $A_2$ and $A_3$ each is

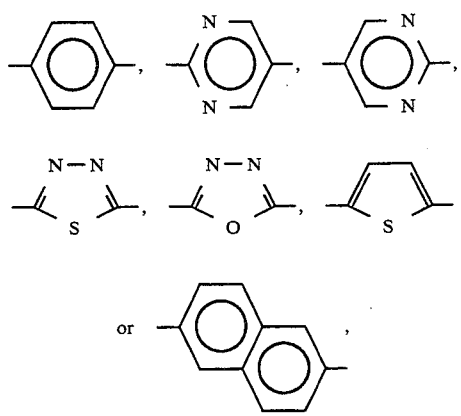

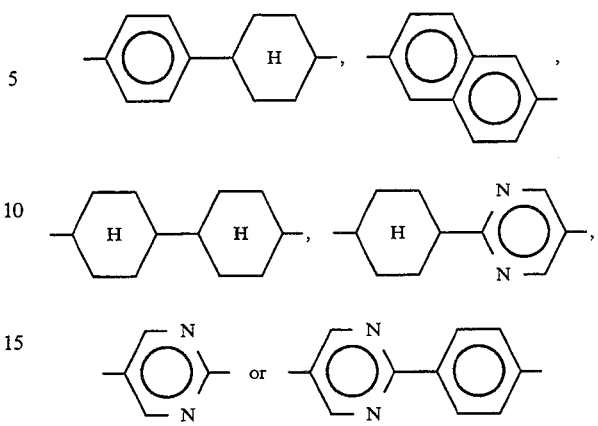

said liquid crystal composition further comprising at least one type of liquid crystal compound having formula (III):

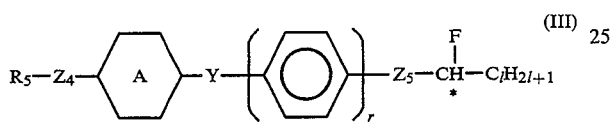

wherein $R_5$ is a straight-chain or branched-chain alkyl group which has 1 to 18 carbon atoms which may be substituted with alkoxy group having 1 to 13 carbon atoms; Y is a single bond,

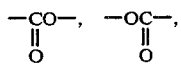

—CH$_2$O—, —OCH$_2$—, —COS— or —CH=CH—COO—;

$Z_4$ is a single bond, —O—,

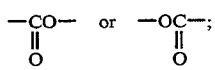

$Z_5$ is —OCH$_2$—,

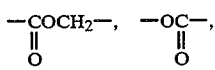

—O—(CH$_2$)$_k$—O—CH$_2$—, wherein k is an integer of 1 to 4,

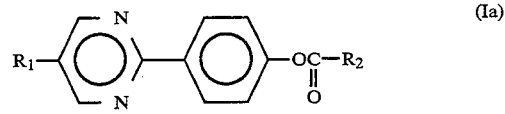

r is 1 or 2 and l is 1 to 12, wherein the weight ratio of the compound of formula (I) to the compound of formula (II) is from 100:1 to 1:100 and the weight ratio of the total amount of the compounds of formulae (I) and (II) to the compound of formula (III) is from 1:30 to 100:1.

2. A liquid crystal composition according to claim 1, wherein said liquid crystal compound expressed by said general formula (I) is a compound expressed by the following formula (Ia) or (Ib).

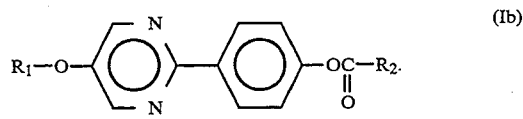

3. A liquid crystal composition according to claim 1, wherein $R_1$ and $R_2$ of said general formula (I) are one of the following compounds (I-i) to (I-iii):

(I-i) an alkyl group having 1 to 16 carbon atoms;

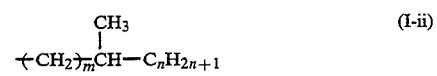

wherein m is an integer of 0 to 7 and n is an integer of 1 to 9, m and n satisfy the condition of $2 \leq m+n \leq 14$.

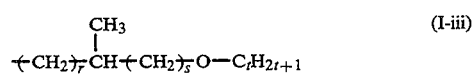

wherein r is an integer of 0 to 7, s is 0 or 1 and t is an integer of 1 to 14, and r, s and t satisfy the condition of $1 \leq r+s+t \leq 14$.

4. A liquid crystal composition according to claim 1, wherein said liquid crystal compound having said formula (II) is selected from one of the compounds having the following formulae (IIa) to (IIe):

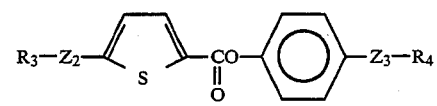 (IIa)

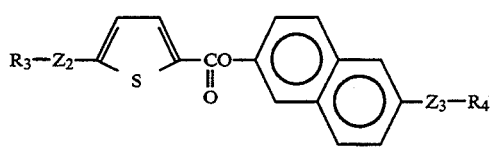 (IIb)

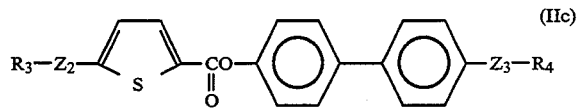 (IIc)

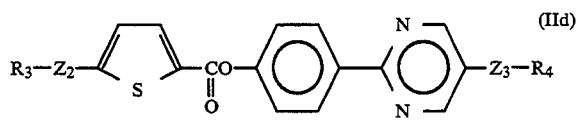 (IId)

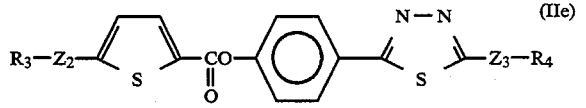 (IIe)

wherein $R_3$ and $R_4$ each is a straight-chain or branched-chain alkyl group having 1 to 18 carbon atoms which may be substituted with alkoxy group having 1 to 12 carbon atoms or F; $Z_2$ and $Z_3$ each is a single bond,

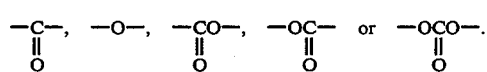

5. A liquid crystal composition according to claim 1, wherein $R_3$ and $R_4$ in said general formula (II) are selected from any of (II-i) to (II-iv):

(II-i) an-alkyl groups having 2 to 16 carbon atoms;

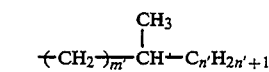 (II-ii)

wherein m' is an integer of 0 to 7 and n' is an integer of 1 to 9;

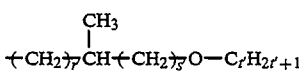 (II-iii)

wherein r' is an integer of 0 to 7, s' is 0 or 1 and t' is an integer of 1 to 14;

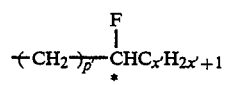 (II-iv)

wherein p' is 0 or 1 and x' is an integer of 1 to 14, and symbol * designates an asymmetric carbon.

6. A liquid crystal composition according to claim 1, wherein said compound having said formula (III) is selected from any of the compounds having the following formulae (III-a) to (III-f):

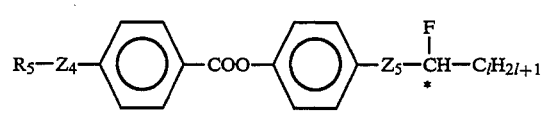 (III-a)

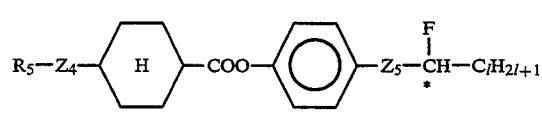 (III-b)

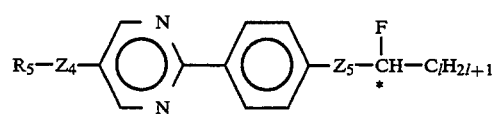 (III-c)

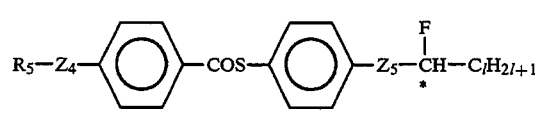 (III-d)

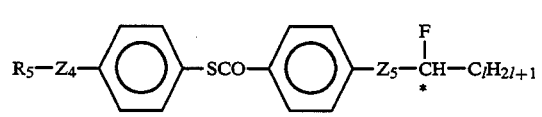 (III-e)

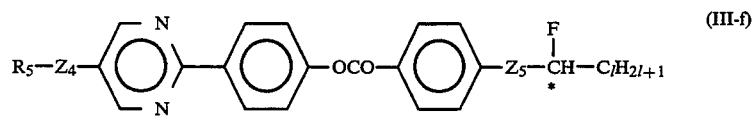 (III-f)

wherein $R_5$ is a straight-chain or branched-chain alkyl group which has 1 to 18 carbon atoms and which may be substituted with alkoxy group having 1 to 13 carbon atoms; $Z_4$ is a single bond, —O—,

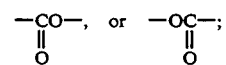

$Z_5$ is —OCH$_2$—,

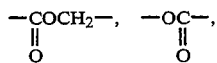

—O—(CH$_2$)$_k$—O—CH$_2$—, wherein k is an integer of 1 to 4 and l is an integer of 1 to 12.

7. A liquid crystal composition according to claim 6, wherein $Z_4$ and $Z_5$ in said compounds (III-a) to (III-f) are selected from any of the following (III-i) to (III-v):
(III-i) $Z_4$ is a single bond and $Z_5$ is —O—CH$_2$—;
(III-ii) $Z_4$ is a single bond and $Z_5$ is —COO—CH$_2$—;
(III-iii) $Z_4$ is a single bond and $Z_5$ is —OCO—;
(III-iv) $Z_4$ is —O— and $Z_5$ is —O—CH$_2$—;
(III-v) $Z_4$ is —O— and $Z_5$ is —COOCH$_2$—.

8. A liquid crystal composition according to claim 1, wherein the total amount of said liquid crystal compounds having said general formulae (I) and (II) in said liquid crystal composition is from 1 to 90 wt % based on the total weight of said liquid crystal composition.

9. A liquid crystal composition according to claim 1, wherein the total amount of said liquid crystal compounds having said general formulae (I) and (II) in said liquid crystal composition is from 2 to 80 wt % based on the total weight of said liquid crystal composition.

10. A liquid crystal composition according to claim 1, wherein the total amount of said liquid crystal compounds having said general formulae (I) and (II) in said liquid crystal composition is from 4 to 80 wt % based on the total weight of said liquid crystal composition.

11. A liquid crystal composition according to claim 1, wherein the total amount of said liquid crystal compounds having said general formulae (I), (II) and (III) in said liquid crystal composition is from 1 to 90 wt % based on the total weight of said liquid crystal composition.

12. A liquid crystal composition according to claim 1, wherein the total amount of said liquid crystal compounds having said general formulae (I), (II) and (III) in said liquid crystal composition is from 4 to 90 wt % based on the total weight of said liquid crystal composition.

13. A liquid crystal composition according to claim 1, wherein the total amount of said liquid crystal compounds having said general formulae (I), (II) and (III) in said liquid crystal composition is from 6 to 80 wt % based on the total weight of said liquid crystal composition.

14. A liquid crystal composition according to claim 1, wherein said composition has a chiral smectic phase.

15. A liquid crystal device comprising a pair of electrode substrates having any of said liquid crystal composition according to claims 1 or 2 to 14 disposed therebetween.

16. A liquid crystal device according to claim 15, further comprising an orientation control layer provided on each said electrode substrate.

17. A liquid crystal display device according to claim 16, wherein said orientation control layer has been treated by rubbing.

18. A liquid crystal display device according to claim 15, wherein said electrode substrates are spaced a predetermined distance from each other.

19. A display apparatus, comprising a liquid crystal device of claim 15.

20. A display apparatus according to claim 19, further comprising a drive circuit for driving said liquid crystal device.

21. A display apparatus according to claim 19, further comprising an illuminating light source.

* * * * *

UNITED STATES PATENT AND TRADEMARK OFFICE
CERTIFICATE OF CORRECTION

PATENT NO. : 5,413,735

DATED : May 9, 1995

INVENTOR(S): MASATAKA YAMASHITA ET AL.   Page 1 of 3

It is certified that error appears in the above-identified patent and that said Letters Patent is hereby corrected as shown below:

COLUMN 1

Line 42, "maintain" should read --maintains--.

COLUMN 2

Line 21, "illustrate" should read --illustrates--.
Line 50, "Moe" should read --More--.
Line 63, "view point" should read --viewpoint--.
Line 68, " "black' " should read --"black"--.

COLUMN 5

Line 55, "is a block diagram" should read --are block diagrams.--

COLUMN 8

Line 23, "the:liquid" should read --the liquid--.

COLUMN 17

Line 36, "refine" should read --refined--.

UNITED STATES PATENT AND TRADEMARK OFFICE
CERTIFICATE OF CORRECTION

PATENT NO. : 5,413,735

DATED : May 9, 1995

INVENTOR(S): MASATAKA YAMASHITA ET AL.

It is certified that error appears in the above-identified patent and that said Letters Patent is hereby corrected as shown below:

COLUMN 25

Form (2-90), "-(CH$_3$)$_5$-" should read -- -(CH$_2$)$_5$- --.

COLUMN 29

Line 31, "1508" should read --1508,--.
Line 37, "81.9" should read --81.0--.

COLUMN 30

Line 43, "(2-(2-" should read -- 2-(2- --.
Line 51, "1250" should read --1250,--.

COLUMN 33

Form (3-22), "-C$_6$H$_1$" should read -- -C$_6$H$_{13}$ --.

COLUMN 48

Line 67, "to" should be deleted.

COLUMN 57

Line 23, "are" should read --and are--.

UNITED STATES PATENT AND TRADEMARK OFFICE
CERTIFICATE OF CORRECTION

PATENT NO. : 5,413,735

DATED : May 9, 1995

INVENTOR(S): MASATAKA YAMASHITA ET AL.

It is certified that error appears in the above-identified patent and that said Letters Patent is hereby corrected as shown below:

COLUMN 62

Line 21, "s" should read --a--.

COLUMN 78

Line 4, "an-alkyl" should read --n-alkyl--.

Signed and Sealed this

Twenty-first Day of November, 1995

Attest:

BRUCE LEHMAN

Attesting Officer

Commissioner of Patents and Trademarks